(12) United States Patent
Qu

(10) Patent No.: US 11,616,400 B2
(45) Date of Patent: Mar. 28, 2023

(54) ELECTRONIC DEVICE

(71) Applicant: GUANGDONG OPPO MOBILE TELECOMMUNICATIONS CORP., LTD., Guangdong (CN)

(72) Inventor: Chunying Qu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 305 days.

(21) Appl. No.: 17/113,014

(22) Filed: Dec. 5, 2020

(65) Prior Publication Data

US 2021/0194287 A1  Jun. 24, 2021

(30) Foreign Application Priority Data

Dec. 24, 2019 (CN) .......................... 201911346515.6

(51) Int. Cl.
H02J 7/00 (2006.01)
H02J 50/12 (2016.01)
H02J 50/40 (2016.01)
H02J 7/02 (2016.01)

(52) U.S. Cl.
CPC ............... H02J 50/12 (2016.02); H02J 7/02 (2013.01); H02J 50/402 (2020.01)

(58) Field of Classification Search
None
See application file for complete search history.

(56) References Cited

U.S. PATENT DOCUMENTS

| 2012/0206098 A1* | 8/2012 | Kim | B60L 53/39 320/108 |
| 2014/0009120 A1 | 1/2014 | Kim | |
| 2015/0194814 A1* | 7/2015 | Taylor | H04B 5/0087 307/104 |

(Continued)

FOREIGN PATENT DOCUMENTS

| CN | 202737499 | 2/2013 |
| CN | 207766037 | 8/2018 |

(Continued)

OTHER PUBLICATIONS

IPIN, Examination Report for IN Application No. 202014053667, dated Dec. 15, 2021.

(Continued)

*Primary Examiner* — Arun C Williams
(74) *Attorney, Agent, or Firm* — Hodgson Russ LLP

(57) ABSTRACT

An electric device provided by the disclosure includes: a battery; at least two charging circuits respectively connected with the battery; a charging port, connected with the at least two charging circuits; and at least two wireless receiving circuits, connected with the at least two charging circuits by one-to-one correspondence; wherein the at least two charging circuits are configured for processing a voltage and a current output by the charging port or each wireless receiving circuits, and providing the processed voltage and current to charge the battery. The electric device charges the battery by using multiple charging circuits, which may improve the charging power of the battery and accelerate the charging rate.

20 Claims, 10 Drawing Sheets

(56) References Cited

U.S. PATENT DOCUMENTS

2015/0326068 A1* 11/2015 Bell ................. H02J 50/80
                                                              307/149
2015/0357851 A1   12/2015  Huang et al.
2022/0085662 A1*  3/2022  Narayana Bhat .... H04B 5/0087

FOREIGN PATENT DOCUMENTS

| CN | 109066884 | 12/2018 |
|---|---|---|
| CN | 109217487 | 1/2019 |
| CN | 109217488 | 1/2019 |
| CN | 110518668 | 11/2019 |
| EP | 2680393 | 1/2014 |
| EP | 3136543 | 3/2017 |
| EP | 3352325 | 7/2018 |

OTHER PUBLICATIONS

European Patent Office, Search Report for EP Application No. 20213817.8, dated Mar. 5, 2021.
WIPO, International Search Report for PCT Application No. PCT/CN2020/138242, dated Mar. 22, 2021.

* cited by examiner

ELECTRONIC DEVICE

CROSS-REFERENCE TO RELATED APPLICATION

This application claims priority to Chinese Patent Application No. 201911346515.6, filed Dec. 24, 2019, the entire disclosure of which is incorporated herein by reference.

TECHNICAL FIELD

The present disclosure relates to the field of terminal technologies, in particular to an electronic device.

BACKGROUND

Electronic devices (such as smart phones, mobile terminals or smart devices) are more and more popular among consumers, but they have large power consumption, and need to be charged frequently. However, it usually takes several hours of time to charge the electronic devices with low-power ordinary charging solution, and in order to meet the challenge, quick charging solutions that increase the charging power of electronic devices have been proposed by the industry to charge the devices to be charged.

However, with the increase of the battery capacity of the electronic devices, users have higher and higher requirements for charging speed. The current quick charging solutions cannot meet the increasing demand for the charging rate.

It should be noted that the information disclosed in the above-mentioned background part is only used to enhance the understanding of this disclosure, and therefore may include information that does not constitute prior art known to those of ordinary skill in the art.

SUMMARY

The present disclosure aims to provide an electronic device, the charging power of the electronic device may be improved, thereby increasing the charging rate.

Other features and advantages of the disclosure will become apparent thorough the following detailed description, or be partly learned through the practice of the disclosure.

According to an aspect of the disclosure, an electronic device is provided, which comprises: a battery, at least two charging circuits, a charging port, and at least two wireless receiving circuits. The at least two charging circuits is respectively connected with the battery. The charging port is connected with the at least two charging circuits, and configured for receiving an output voltage and an output current of a power supply device. The at least two charging circuits is configured for processing a voltage and a current output by the charging port, and providing the processed voltage and current to the battery for charging. The at least two wireless receiving circuits are connected with the at least two charging circuit in one-to-one correspondence, and configured for receiving an electromagnetic signal transmitted by a wireless charging device, and converting the electromagnetic signal into an output voltage and an output signal. And the at least two charging circuits is further configured to process a voltage and a current output by the at least two wireless receiving circuits, and provide the processed voltage and current to the battery for charging.

The electronic device provided by the embodiments of the disclosure includes at least two charging circuits. Whether it during wired charging or wireless charging, the at least two charging circuits can be shared. The at least two charging circuits charge the battery simultaneously, thereby enhancing the charging power of the battery, and accelerating the charging speed of the battery.

It should be understood that the above general description and the following detailed description are merely exemplary and explanatory, and cannot limit the disclosure.

BRIEF DESCRIPTION OF THE DRAWINGS

The accompanying drawings here are incorporated into the specification and constitute a part of the specification, show embodiments in accordance with the present disclosure, and together with the specification, are used to explain the principles of the disclosure. Obviously, the accompanying drawings described below are merely some embodiments of the disclosure. For a person ordinarily skilled in the art, other accompanying drawings can also be obtained in light of these accompanying drawings, without paying inventive effort.

DETAILED DESCRIPTION OF PREFERRED EMBODIMENTS

Figure 1:
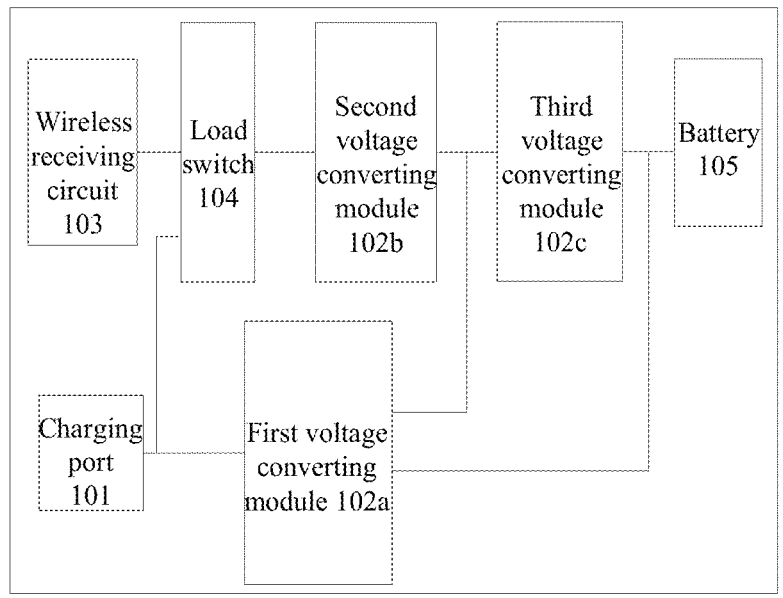
FIG. 1 is a schematic structural diagram of an electronic device in the related art according to an example.

Exemplary embodiments will be described more comprehensively with reference to the accompanying drawings. However, exemplary embodiments can be implemented in various forms, and should not be construed as being limited to the examples set forth herein. On the contrary, these embodiments are provided to make the disclosure more comprehensive and complete, and comprehensively delivery the idea of the exemplary embodiments to those skilled in the art. The described features, structures or characteristics can be combined in one or more embodiments in any appropriate manner.

Further, the accompanying drawings are merely schematic illustrations of the disclosure, and are not necessarily drawn to scale. The same reference numerals in the drawings represent the same or similar parts, and thus their repeated descriptions will be omitted. Some block diagrams represented in the accompanying drawings are functional entities, and do not necessarily correspond to physically or logically independent entities. These functional entities may be implemented in software form, or in one or more hardware modules or integrated circuits, or in different networks and/or processor devices and/or microcontroller devices.

In this disclosure, unless otherwise expressly specified and defined, terms "connect", "link" and other terms shall be understood broadly, and for example, a connection may be an electric connection, or a communication connection; may be a direct connection, or an indirect connection. For those of ordinary skill in the art, the specific meanings of the above-mentioned terms in the disclosure could be understood according to specific situations.

Furthermore, terms "first", "second" are only for description, and cannot be understood as indicating or implying to have importance in relativity, or implicitly indicating the number of the referred technical features. "And/or" describes an association relationship between associated objects, indicating that there can be three kinds of relationships, and for example, A and/or B may indicate three situations, which are just A, just B, and both A and B. The character "I" generally indicates that the associated objects before and after are in an "or" relationship.

FIG. 1 is a schematic structural diagram showing an electronic device in the related art according to an exemplary embodiment.

The electronic device 10 shown in FIG. 1 can support both wired charging mode and wireless charging mode.

When the wired charging mode is adopted for charging, the electronic device 10 is connected with a power supply device (such as power adapter, Power Bank, etc.) through a cable, and receives the electrical energy output by the power supply device to charge the battery in the electronic device 10.

When the wireless charging mode is adopted for charging, a wireless charging device (such as wireless charging dock) is usually connected with the power supply device, and receives the electrical energy output by the power supply device. The electronic device 10 is placed on the wireless charging device, and the wireless charging device will convert the electrical energy output by the power supply device into an electromagnetic signal (or an electromagnetic wave) and send the electromagnetic signal (or the electromagnetic wave) to the electronic device 10 to charge the battery in the electronic device 10.

Refer to FIG. 1, the electronic device 10 includes: a charging port 101, a first voltage converting module 102a, a second voltage converting module 102b, a third voltage converting module 102c, a wireless receiving circuit 103, a load switch 104 and a battery 105.

The wired charging solution and the wireless charging solution in the related art are respectively described below.

During wired charging, the electronic device 10 is connected with a power supply device through the charging port 101. During quick charging, taking the battery 105 with a single cell as an example, the maximum output voltage and the maximum output current of the power supply device are 10V and 4 A respectively. An output voltage and An output current of the power supply device are respectively converted through the first voltage converting module 102a (e.g., Buck circuit) and the third voltage converting module 102c (such as Charge Pump (CP) circuit), the charging voltage and the charging current applied to both ends of the battery 105 are respectively 5V and 8 A. Therefore, in the wired charging solution, the maximum charging power of the battery is 40 W.

During wireless charging, the electronic device 10 receives the electromagnetic signal (or the electromagnetic wave) transmitted by a wireless charging device through the wireless receiving circuit 103. During quick charging, still taking the battery 105 with a single cell as an example, the maximum output voltage and the maximum output current of the wireless receiving circuit 103 are 20V and 1.5 A respectively, which are converted through the second voltage converting module 102b (e.g., CP circuit) and the third voltage converting module 102c respectively, and then applied to two ends of the battery 105. The charging voltage and the charging current applied to two ends of the battery 105 are 5V and 6 A respectively. Therefore, in the wireless charging solution, the maximum charging power of the battery is 30 W.

As described above, with the increasement of the battery capacity of electronic devices, users have higher and higher requirements to charging rate. The current quick charging solution cannot meet the increasing requirements for charging rate.

Therefore, embodiments of the disclosure provide a device to be charged, which can improve the charging power, thereby improving charging rate, no matter in the wired charging mode or in the wireless charging mode.

Hereinafter, the device to be charged provided by embodiments of the disclosure is specifically described through the following embodiments.

Figure 2:
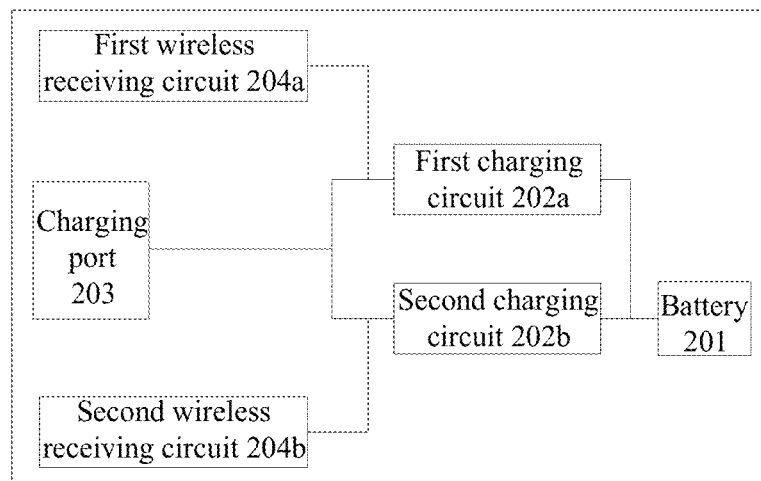
FIG. 2 is a schematic structural diagram of a device to be charged provided by an exemplary embodiment of the disclosure.

FIG. 2 is a schematic structural diagram of a device to be charged provided by an exemplary embodiment of the disclosure.

The device to be charged 20 as shown in FIG. 2, for example, may be a terminal or a electronic device, the terminal or the electronic device includes, but is not limited to, being configured to be connected via wire-line, such as via public switched telephone network (PTSN), digital subscriber line (DSL), digital cables, direct cable connection, and/or another data connection/network and/or via, for example, devices that receive/transmit communication signals for cellular networks, wireless local area networks (WLAN), digital television networks (such as digital video broadcasting handheld (DVVB_H)), satellite networks, amplitude modulation-frequency modulation (AM-FM) broadcasting transmitter, and/or wireless interfaces of another terminal. Communication terminals configured to communicate through wireless interfaces may be referred as "wireless communication terminals", "wireless terminals", and/or "mobile terminals". Examples of terminals include, but not limited to, satellite or cellular phones; personal communication system (PCS) terminals that may combine cellular wireless phone with data processing, fax, and data communication capabilities; Personal Digital Assistants (PDA) that may include radio telephone, pager, Internet/Intranet access, Web browser, note pads, calendars, and/or global positioning system (GPS) receiver; and conventional laptop and/or palmtop receiver or other electronic devices include radio telephone transceiver. Further, the terminals may also include, but not limited to, chargeable electronic devices with charging function such as e-book reader, smart wearable devices, mobile power supply (such as power bank, travel charger), electronic cigarette, wireless mouse, wireless keyboard, wireless headset, Bluetooth speaker, etc.

Refer to FIG. 2, device to be charged include: a battery 201, a first charging circuit 202a, a second charging circuit 202b, a charging port 203, a wireless receiving circuit 204a, and a second wireless receiving circuit 204b.

Wherein, the battery 201 may be, for example, a single battery or cell, or a lithium battery including a plurality of cells in series. Alternatively, the battery 201 may also include plurality of battery cells in series, each battery cell is a lithium battery including a single cell or including a plurality of cells. When the battery 201 include a plurality of cells or a plurality of battery cells, each battery cell or cell may be charged respectively, or the plurality of battery cells or the plurality of cells may be charged as a whole.

Taking the battery 201 including two battery cells in series, and each battery cell including a single cell as an example, it is described below that how to use a plurality of battery cells in series, when charging at a high current, to increase the charging speed and decrease the calorific value of the device to be charged:

For the device to be charged including a single battery cell, the heating phenomenon of the device to be charged will be relatively serious, when a relatively large charging current is used to charge the single battery. In order to guarantee the charging speed of the device to be charged, and alleviate the heating phenomenon of the device to be charged during charging, the structure of the battery can be modified to use a plurality of battery cells in series, and directly charge the plurality of cells, i.e., the voltage output by an adapter is directly applied to both ends of each of the plurality of battery cells. Compared with the solution of single battery cell (i.e., the capacity of a single battery cell before modification is considered to be the same as the total capacity of the plurality of battery cells in series after modification), if the same charging speed is to be achieved, the charging current applied to each of the plurality of battery cells is about 1/N of charging current required by a single battery cell. In other words, under the premise of ensuring the same charging speed, the plurality of battery cells in series can greatly reduce the size of the charging current, thereby further reduce the calorific value of the device to be charged during charging. Therefore, in order to improve the charging speed and reduce the calorific value of the device to be charged during charging, the device to be charged may adopt a plurality of battery cells in series.

In addition, the battery 201 may also include, for example, a lithium battery including a plurality of cells in parallel, or may include a plurality of battery cells in parallel, and each battery cell is a lithium battery including a single cell or a plurality of cells.

The first charging circuit 202a and the second charging circuit 202b are respectively connected with the battery 201. The voltages and currents respectively output by the charging circuit 202a and the second charging circuit 202b are respectively applied to both ends of the battery to charge the battery 201.

The charging port 203 is connected with the first charging circuit 202a and the second charging circuit 202b, and is configured for receiving the output voltage and the output current of the power supply device (such as power adapter, mobile power, etc.).

The first charging circuit 202a and the second charging circuit 202b process the voltage and the current output by the charging port 203, and provide the processed voltage and current to the battery 201 for charging.

The wireless receiving circuit 204a and the second wireless receiving circuit 204b are connected with the first charging circuit 202a and the second charging circuit 202b in one-to-one correspondence, and are configured to receive the electromagnetic signal transmitted by the wireless charging device (such as wireless charging dock), and convert the received electromagnetic signal into an output voltage and an output current.

The charging circuit 202a and the charging circuit 202b are also configured to process the voltage and current output by the first wireless receiving circuit 204a and the second wireless receiving circuit 204b, and provide the processed voltage and current to the battery for charging.

Figure 3:
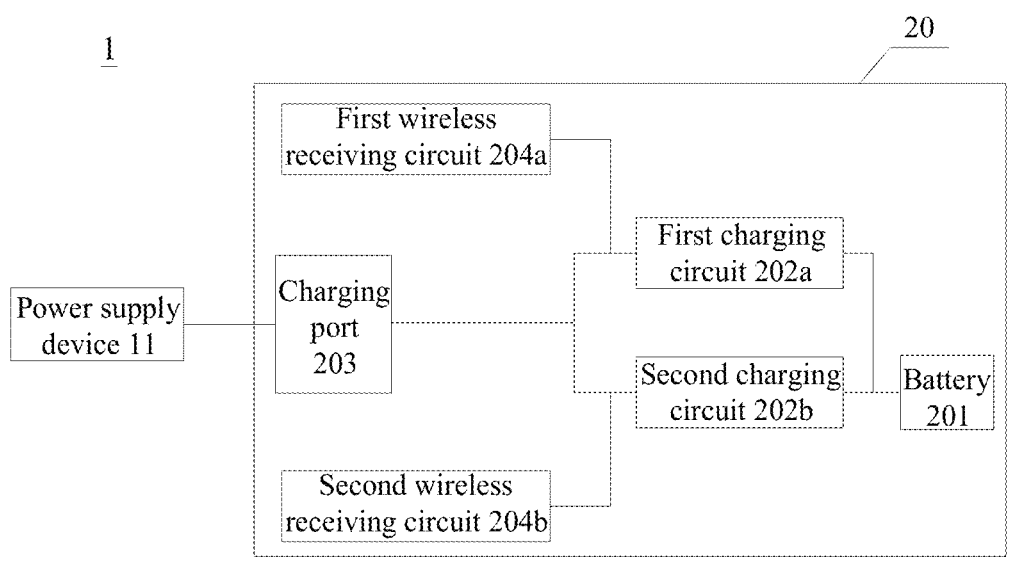
FIG. 3 is a schematic structural diagram of a wired charging system provided by an exemplary embodiment of the disclosure.

FIG. 3 is a schematic structural diagram of a wired charging system provided by an exemplary embodiment of the disclosure.

As shown in FIG. 3, the wired charging system 1 includes: a device to be charged 20 as shown in FIG. 2 and a power supply device 11.

The charging port 203 may be, for example, a USB 2.0 port, a Micro USB port or a USB TYPE-C port. In some embodiments, the charging port 203 may also be a lightning interface, or any other type of parallel port or series port that can be used for charging.

The device to be charged 20 may, for example, communicate with the power supply device 11 through the charging port 203 without setting an additional communication interfaces or other wireless communication modules. For example, the charging port 203 is a USB port, the device to be charged 20 may communicate with the power supply device 11 based on the data lines (such as D+ and/or D− line) in the USB port. For another example, the charging port 203 is a USB port (such as USB TYPE-C port) supporting Power Delivery (PD) communication protocol. Further, the device to be charged 20 may also communicate with the power supply device through other communication manners besides the charging port 203. For example, the device to be charged 20 may communicate with the power supply device 11 in a wireless manner, such as Near Field Communication (NFC) and the like.

Figure 4:
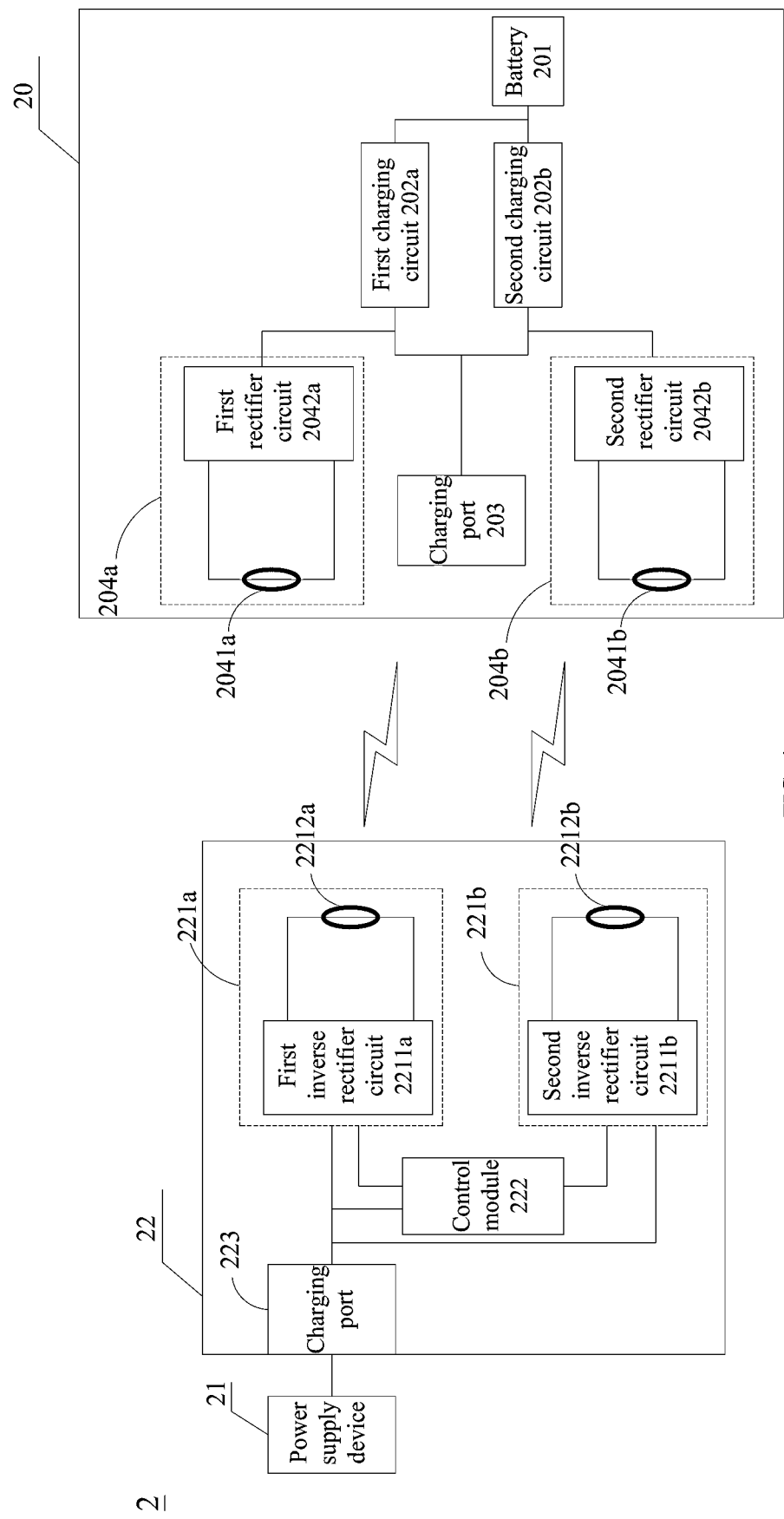
FIG. 4 is a schematic structural diagram of a wireless charging system provided by an exemplary embodiment of the disclosure.

FIG. 4 is a schematic structural diagram of a wireless charging system provided by an exemplary embodiment of the disclosure.

As shown in FIG. 4, the wireless charging system 2 includes: a device to be charged 20 as shown in FIG. 2, a power supply device 21, and a wireless charging device 22.

The power supply device 21 may be, for example, a power adapter, a mobile power and other devices. The wireless charging device 22 may be, for example, a wireless charging dock.

The power supply device 21 transmits its output current to wireless charging device 22 after connecting with the wireless charging device 22 through cable.

The wireless charging device 22 includes: a first wireless transmitting circuit 221a, a second wireless transmitting circuit 221b, a control module 222, and a charging port 223.

Wherein, the wireless charging device 22 is connected with the power supply device 21 through the charging port 223, and receives the electrical energy output by the power supply device 21.

The charging port 223 may be, for example, a USB 2.0 interface, a Micro USB port, or a USB TYPE-C port. In some embodiments, the charging port 223 may also be a lightning interface, or any other type of parallel port or series port that can be used for charging.

The wireless charging device 22 may also communicate with the power supply device 21 through the charging port 223 without setting additional communication interfaces or other wireless communication modules, which can simplify the implementation of the wireless charging device 22. For example, the charging port 223 is a USB port, and the wireless charging device 22 may communicate with the power supply device 21 based on the data lines (such as D+ and/or D-line) in the USB port. For another example, the charging port 223 is a USB port supporting PD communication protocol, and the wireless charging device 22 may communicate with the power supply device 21 based on PD communication protocol.

Further, the wireless charging device 22 may also communicate with the power supply device 21 through other communication manners besides the charging port 223. For example, the wireless charging device 22 may communicate with the power supply device 21 in a wireless manner, such as NFC, Bluetooth communication.

The first wireless transmitting circuit 221a and the second wireless transmitting circuit 221b are respectively connected with the charging port 223, and are configured to convert the electrical energy output by the power supply device 21 into an electromagnetic signal (or an electromagnetic wave) for transmission, so as to wirelessly charge the device to be charged 20. For example, the first wireless transmitting circuit 221a and the second wireless transmitting circuit 221b each may include: an inverse rectifier circuit and a transmitting coil (or a transmitting antenna). The inverse rectifier circuit is configured to convert the direct current output by the power supply device 21 into high frequency alternating current, and the high frequency alternating current is converted into an electromagnetic signal (or an electromagnetic wave) and sent out through the transmitting coil or the transmitting antenna.

In some embodiments, as shown in FIG. 4, the first wireless transmitting circuit 221a may include, for example, a first inverse rectifier circuit 2211a and a first transmitting coil 2212a. The second wireless transmitting circuit 221b include: a second inverse rectifier circuit 2211b and a second transmitting coil 2212b.

The control module 222 are respectively connected with the first wireless transmitting circuit 221a and the second wireless transmitting circuit 221b, and are configured for controlling the first wireless transmitting circuit 221a and the second wireless transmitting circuit 221b to transmit the above-mentioned electromagnetic signal (or electromagnetic wave). That is, the first wireless transmitting circuit 221a and the second wireless transmitting circuit 221b are controlled to wirelessly charge the device to be charged 20, through the first wireless transmitting circuit 221a and/or the second wireless transmitting circuit 221b.

The control module 222 may be implemented by, for example, Micro Control Unit (MCU).

Refer to FIG. 2 and FIG. 4 together, the first wireless receiving circuit 204a and the second wireless receiving circuit 204b are respectively configured for receiving the electromagnetic signal (or the electromagnetic wave) transmitted by the wireless charging device 22, and the electromagnetic signal (or the electromagnetic wave) are converted into an direct current and outputted. For example, the first wireless receiving circuit 204a, the second wireless receiving circuit 204b may both include: a receiving coil (or a receiving antenna) and a rectifier circuit connecting to the receiving coil or the receiving antenna, and including a rectifier and/or a filtering circuit.

Without loss of generality, taking the first wireless receiving circuit 204a coupling with the first wireless transmitting circuit 221, the second wireless receiving circuit 204b coupling with the second wireless transmitting circuit 221b as an example, the first wireless receiving circuit 204a converts the electromagnetic signal (or the electromagnetic wave) transmitted by the first wireless transmitting circuit 221a into alternating current through the receiving coil or the receiving antenna, and makes rectifications, filtrations and other operations to the alternating current through a shaping circuit, thereby converting the alternating current into stable direct current for charging the battery.

It should be noted that during charging, the first wireless receiving circuit 204a may couple with the second wireless transmitting circuit 221b, and the second wireless receiving circuit 204b may couple with the first transmitting circuit 221a. For example, when the user places the device to be charged 20 on the wireless charging device 22, if the user places the device to be charged 20 in a position such that the first wireless receiving circuit 204a is close to the second wireless transmitting circuit 221b, and the second wireless receiving circuit 204b is close to the first wireless transmitting circuit 221a, as described above, the first wireless receiving circuit 204a may also couple with the second wireless transmitting circuit 221b, the second wireless receiving circuit 204b couples with the first wireless transmitting circuit 221a. That is, in practical applications, the coupling relationships between the two wireless transmitting circuits and the two wireless receiving circuits are not limited, for example, the coupling connection may be made according to the position relationships of the two wireless transmitting circuits and the two wireless receiving circuits.

It should be noted that embodiments of the disclosure do not specifically limit the specific form of the shaping circuit and the form of the output voltages and the output currents of the first wireless receiving circuit 204a and the second wireless receiving circuit 204b.

In some embodiments, the shaping circuit may include: a rectifier circuit and a filtering circuit. The output voltages of the first wireless receiving circuit 204a and the second wireless receiving circuit 204b may be stable voltages obtained after filtering.

In some embodiments, the shaping circuit may include: a rectifier circuit. The output voltages of the first wireless receiving circuit 204a and the second wireless receiving circuit 204b may be voltages of pulsating waveform obtained after rectifying, the voltages of pulsating waveform are directly applied to both ends of the battery 201 to charge the battery 201. It should be understood that the battery 201 may be charged by the output currents of the first wireless receiving circuit 204a and the second wireless receiving circuit 204b in an intermittent manner, and the period of the output currents of the first wireless receiving circuit 204a and the second wireless receiving circuit 204b vary with the alternating current of the wireless charging system 1 such as the frequency of alternating-current power grid. For example, the frequency corresponding to the period of the output currents of the first wireless receiving circuit 204a and the second wireless receiving circuit 204b is an integer multiple or reciprocal multiple of the frequency of the power grid. And, when the battery 201 is charged by the output currents of the first wireless receiving circuit 204a and the second wireless receiving circuit 204b in the intermittent manner, the current waveforms corresponding to the output currents of the first wireless receiving circuit 204a and the second wireless receiving circuit 204b may be consist of one or a group of pulses in sync with the power grid. The size of voltage/current in pulsating form varies periodically, which, compared with constant direct current, can reduce the lithium precipitation of lithium battery, improve the life of the battery, and help reduce the polarization effect of the battery, increase the charging speed, and reduce the calorific value of the battery, so as to ensure the safety and reliability of the device to be charged during charging.

In some embodiments, as shown in FIG. 4, the first wireless receiving circuit 204a may include: a first receiving coil 2041a, a first shaping circuit 20042a. The second wireless receiving circuit 204b may include: a second receiving coil 2041b, a second shaping circuit 2042b.

In some embodiments, the first receiving coil 2041a and the second receiving coil 2041b are arranged in the same plane in the device to be charged 20, which, for example, may be arranged along the long side of the device to be charged 20, or may be arranged along the wide side of the device to be charged 20. Such an arrangement is more conducive to the heat dissipation of the device to be charged 20, which has a better effect on temperature control.

Figure 5A:
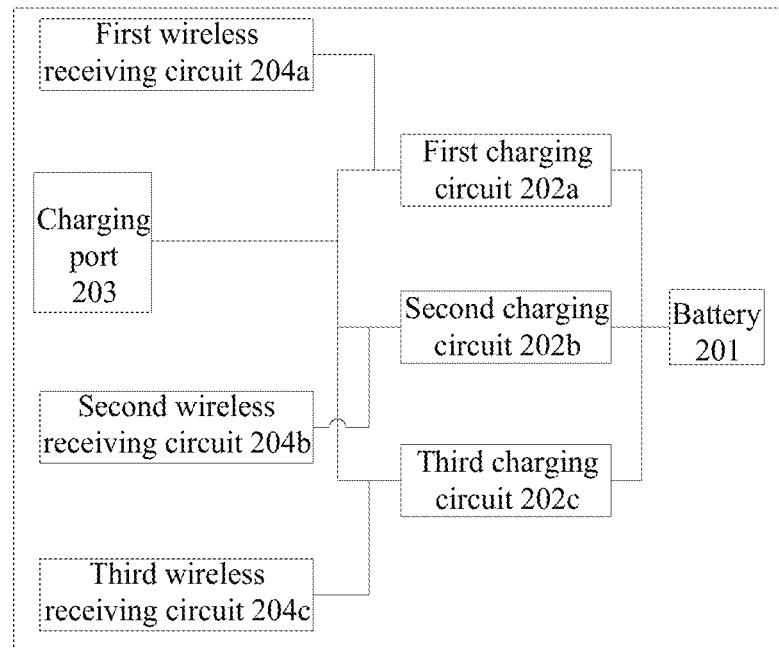
FIG. 5A and FIG. 5B are respectively schematic structural diagrams of another device to be charged provided by an exemplary embodiment of the disclosure.
Figure 5B:
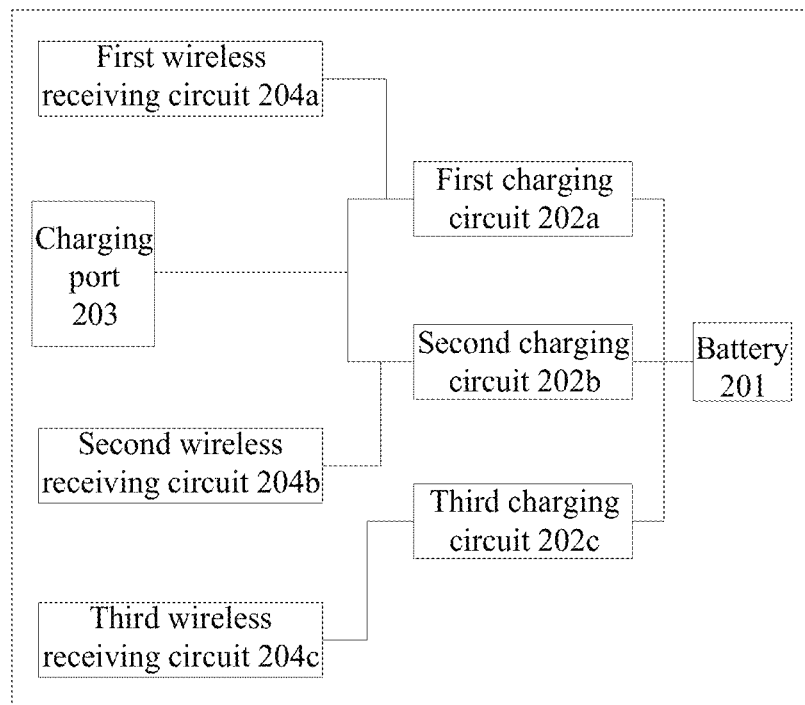

It should be understood by those skilled in the art that although the device to be charged 20 in the FIG. 2 is an example that includes two wireless receiving circuits and two charging circuits, the device to be charged 20 may also include more wireless receiving circuits (such as the three wireless receiving circuits shown in FIG. 5A and FIG. 5B).

FIG. 5A and FIG. 5B are respectively schematic structural diagrams of another device to be charged provided by an exemplary embodiment of the disclosure.

Refer to FIG. 5A, the device to be charged 30 further includes: a third charging circuit 202c and a third wireless receiving circuit 204c. The third charging circuit 202c is also connected with the charging port 203 to process the output voltage and/or the output current provided by the power supply device or the wireless charging device during wired and wireless charging, respectively.

Different from FIG. 5A, the third charging circuit 202c in the device to be charged 30 shown in FIG. 5B may also be connected only with the third wireless receiving circuit 204c, and the third charging circuit 202c is merely configured for processing the output voltage and/or the output current provided by the wireless charging device during wireless charging.

Figure 6:
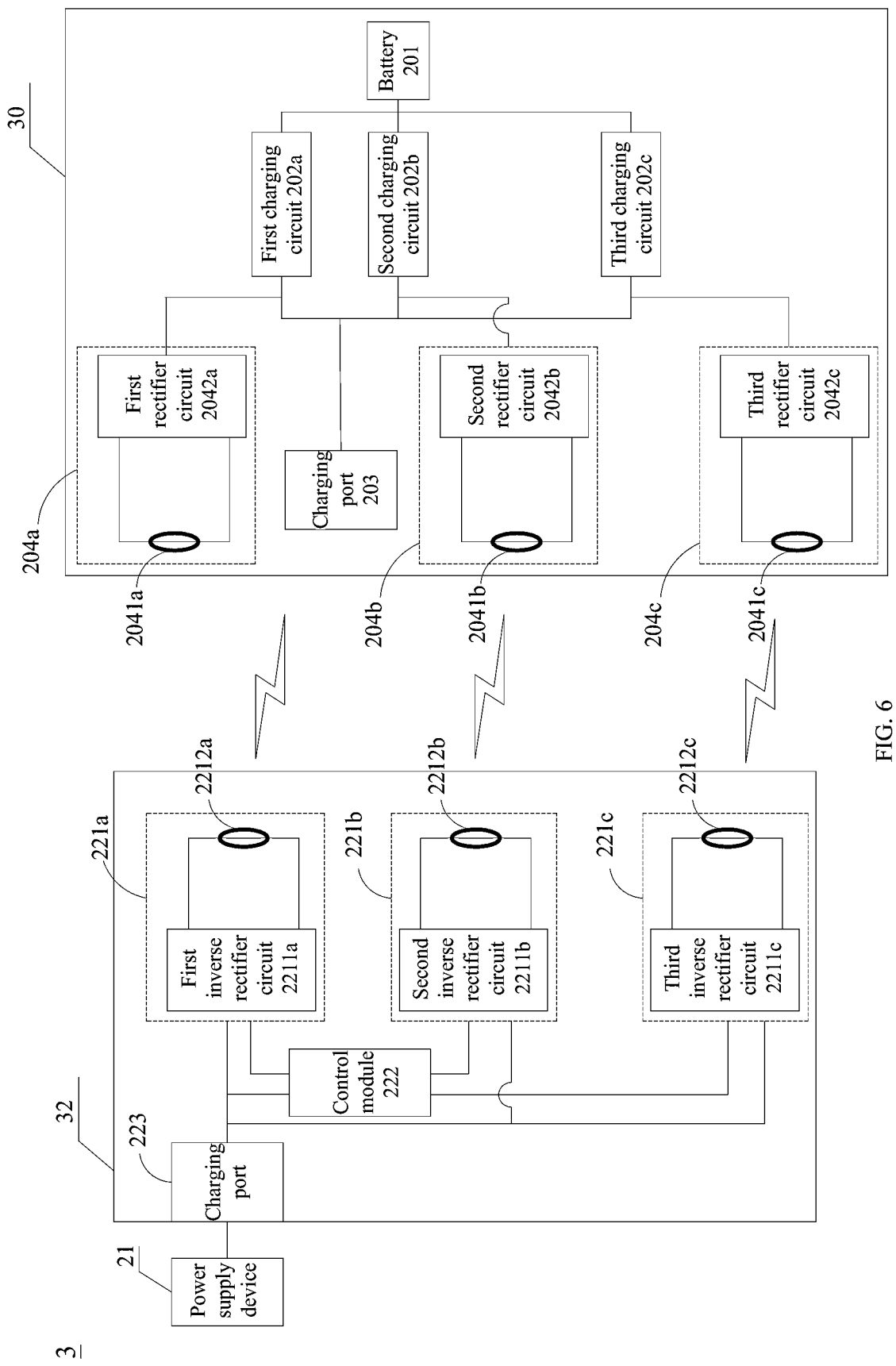
FIG. 6 is a schematic structural diagram of another wireless charging system provided by an exemplary embodiment of the disclosure.

FIG. 6 is a schematic structural diagram of another wireless charging system provided by an exemplary embodiment of the disclosure.

As shown in FIG. 6, the wireless charging system 3 include: the device to be charged 30 shown in FIG. 5A and a wireless charging device 32. The wireless charging device 32 further includes: a third wireless transmitting circuit 221c.

It should be noted that although "first", "second", "third" are used to distinguish different wireless transmitting circuits and wireless receiving circuits, the coupling relationship between different wireless transmitting circuits and wireless receiving circuits is not limited by "first", "second", "third" during the actual charging process. For example, as above-mentioned, one or more wireless charging channels may be formed correspondingly by coupling according to the distance relationship between the wireless transmitting circuits and the wireless receiving circuits. It should be understood by those skilled in the art that the wireless charging channels are wireless virtual channels consist of electromagnetic waves or electromagnetic signals.

The device to be charged provided by the embodiments of the disclosure includes at least two charging circuits, and the at least two charging circuits can be shared, whether in wired charging or wireless charging, to charge the battery simultaneously through the at least two charging circuits. For example, taking two charging circuits and two wireless receiving circuits as an example, during wired charging, each charging circuit may be as shown in FIG. 1, if a charging power of 40 W is output for the battery, the charging power of the battery will reach 80 W, which is doubled. While in wireless charging, each wireless receiving circuit may provide a charging power of 30 W for the battery through corresponding charging circuit, the charging power of the battery will reach 60 W, which is also doubled. When more charging circuits and wireless receiving circuits are used, the charging power will continue to double, so that a quicker charging speed may be realized.

Figure 7A:
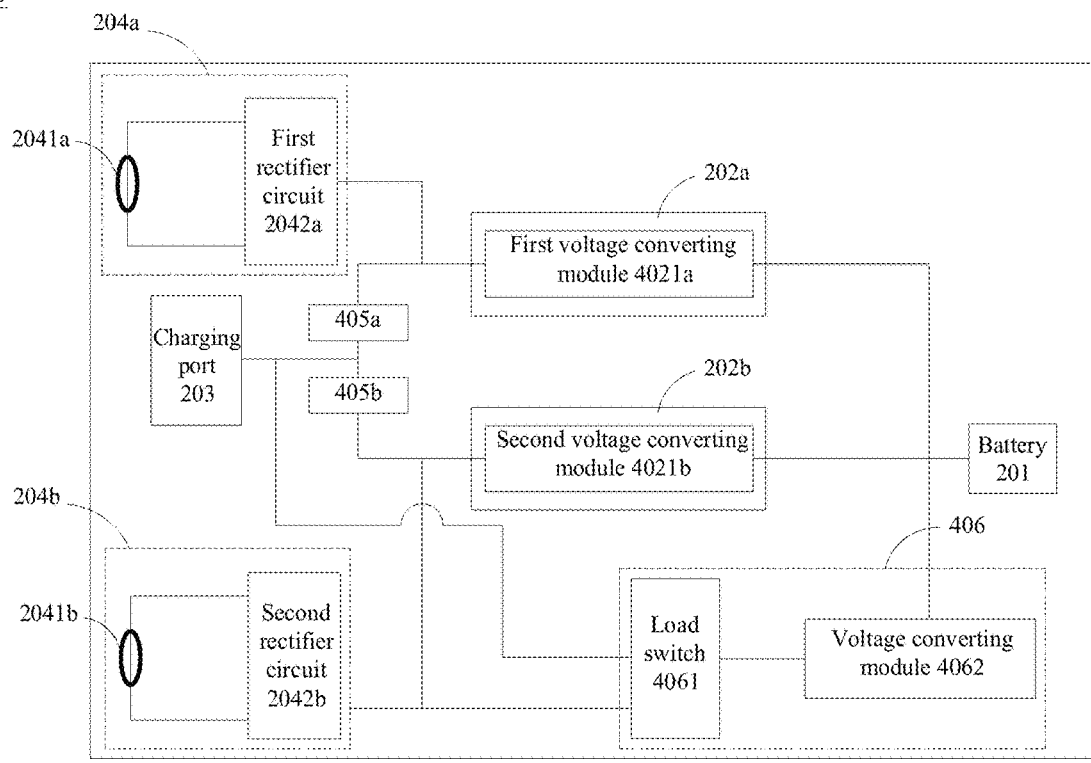
FIG. 7A and FIG. 7B are schematic structural diagrams respectively showing yet another device to be charged provided by an exemplary embodiment of the disclosure.
Figure 7B:
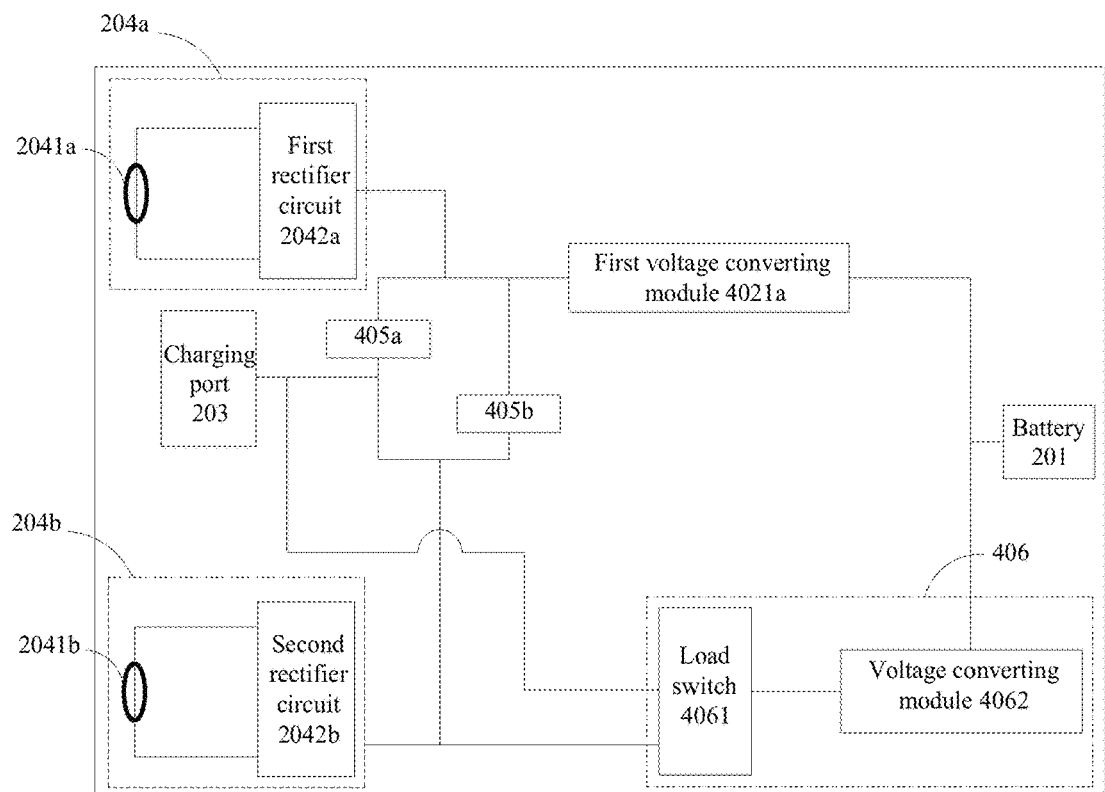

FIG. 7A and FIG. 7B are schematic structural diagrams respectively showing yet another device to be charged provided by an exemplary embodiment of the disclosure.

It should be noted that although in order to simplify the accompanying drawings, the device to be charged 40 is described by taking two charging circuits and two wireless receiving circuits as an example, as mentioned above, the device to be charged 40 may also include more charging circuits and more wireless receiving circuits for charging the battery 201.

Refer to FIG. 7A, the first charging circuit 202a in the device to be charged 40 includes: a first voltage converting module 4021a, the second charging circuit 202b includes: a second voltage converting module 4021b.

The first voltage converting module 4021a and the second voltage converting module 4021b may be, for example, BUCK circuits or Charge Pump (CP) circuits, or may also be BOOST circuits, when the battery includes a plurality of cells in series, the BOOST circuits may be configured for boosting the voltage output by the first wireless receiving circuit 204a and/or the second wireless receiving circuit 204b or the voltage output by the power supply device 11, the disclosure is not limited thereto.

It should be noted that the conversion ratio of the charge pump is not limited in this disclosure, and is set according to actual demands, such as may be set to 1:1, 2:1, 3:1, etc. Further, when the battery 201 includes a plurality of cells in series or a plurality of battery cells in series, the conversion ratio of the charge bump may also be set to 1:2, 1:3 or the like for boost operation, thereby meeting the demands for the charging voltage of the battery 201.

Further, as mentioned above, when the battery 201 includes a plurality of cells or a plurality of battery cells, the charging voltage and/or the charging current output by the first voltage converting module 4021a and the second voltage converting module 4021b may respectively charge each battery cell or cell, and may also charge the plurality of battery cells or the plurality of cells as a whole.

Taking the battery 201 including double cells in series, the first voltage converting module 4021a and the second voltage converting modules 4021b being both charge pumps each with a conversion ratio of 2:1 as an example, during wired charging, if the output voltage and the output current that the power supply device 11 may provide are 20V and 6 A, and the output voltage and the output current become 10 V and 6 A through the conversion of the first voltage converting module 4021a, and the output voltage and the output current also become 10V and 6 A through the conversion of the second voltage converting module 4021b, the two charging circuits may provide a charging power or 120 W to the battery 201 totally.

However, if the output voltage and the output current of each of the first wireless receiving circuit 204a and the second wireless receiving circuit 204b are 20V and 2 A, and the output voltage and the output current of each of the first wireless receiving circuit 204a and the second wireless receiving circuit 204b become 10V and 4 A through the conversion of the first voltage converting module 4021a and the second voltage converting module 4021b respectively, the two charging circuits may provide a charging power of 80 W in total to the battery 201.

In some embodiments, in order to avoid excessive output voltage of the power supply device, as shown in FIG. 7, the device to be charged 40 may further include: a first overvoltage protection circuit 405a and a second overvoltage protection circuit 405b, which are respectively connected with the first voltage converting module 4021a and the second voltage converting module 4021b.

In some embodiments, in order to enable the device to be charged 40 to adapt to other various types of power supply devices or wireless charging devices, the device to be charged 40 further includes: a charging circuit 406, connected with the battery. The charging circuit 406 includes: a load switch 4061 and a voltage converting module 4062. The load switch 4061 includes two inputs and one output, where the two inputs are respectively connected with the charging port 203 and the first wireless receiving circuit 204a, the output is connected with the voltage converting module 4062. The charging circuit 406 may be considered as a compatible charging circuit.

When the device to be charged 40 is connected with, such as, QC power adapter, PD power adapter, or ordinary power adapter (5V and 2 A), the battery 201 may be charged through the charging circuit 406.

Furthermore, when the device to be charged 40 is connected to other wireless charging docks for wireless charging, the battery 201 may also be charged through the charging circuit 406.

The load switch 4061 is controlled by, for example, a high-level control module (such as Application Processor (AP)) of the device to be charged 40 when the high-level module detects that the device to be charged 40 is connected with a power supply device or a wireless charging device. Or, when the AP detects that the device to be charged 40 is connected with a power supply device, the AP may instruct a control module for charging (such as MCU) in the device to be charged 40 to control the load switch 4061.

Moreover, when the device to be charged 40 is connected to a power supply device and is placed on a wireless charging device at the same time, for example, the device to be charged 40 may be configured to perform wired charging, that is, the load switch 4061 is controlled to open the charging path to the charging port 203; or, the device to be charged 40 may be configured to perform wireless charging, that is, the load switch 4061 is controlled to open the charging path to the second wireless receiving circuit 204b. Or, a user may be provided with charging options through the user interface of the device to be charged 40, and the user decides which charging option to adopt, and open the charging path of the charging option accordingly.

It should be noted that although the charging circuit 406 in the drawings only shows one voltage converting module 4062, the disclosure does not limit thereto, in the practical applications, for example, more voltage converting modules may be arranged, according to different batteries, to satisfy the demands for charging voltage of the battery 201. The voltage converting module 4062 may be, for example, a Buck-Boost circuit or a Boost circuit.

It should be noted that although FIG. 7A is an example of each of two charging circuits including one voltage converting module, as shown in FIG. 7B, the two charging circuits may share one voltage converting module, that is, the first voltage converting module 4021a and the second voltage converting module 4021b are implemented as one voltage converting module 4021a. Still taking the battery 201 including double cells in series, and the conversion ratio of the voltage converting module 4021a being 2:1 as an example, the charging power provided to the battery 201 may be doubled no matter in wired charging or in wireless charging.

Figure 8A:
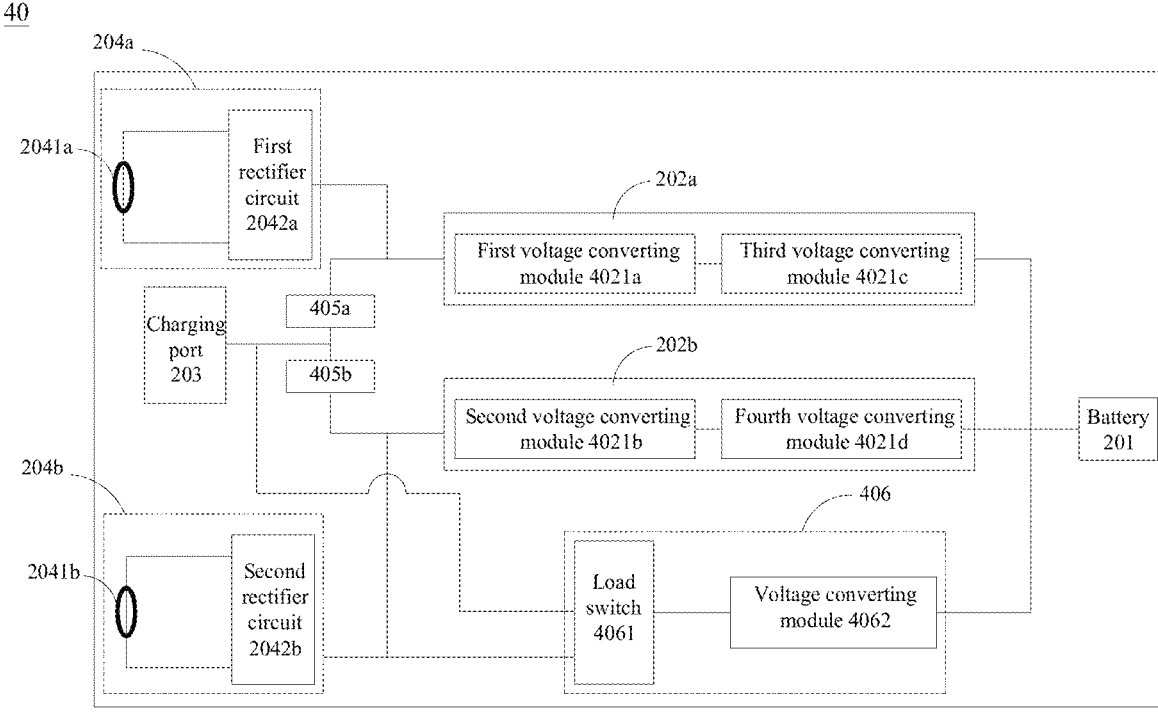
FIG. 8A to FIG. 8C are schematic structural diagrams respectively showing yet another device to be charged provided by an exemplary embodiment of the disclosure.
Figure 8B:
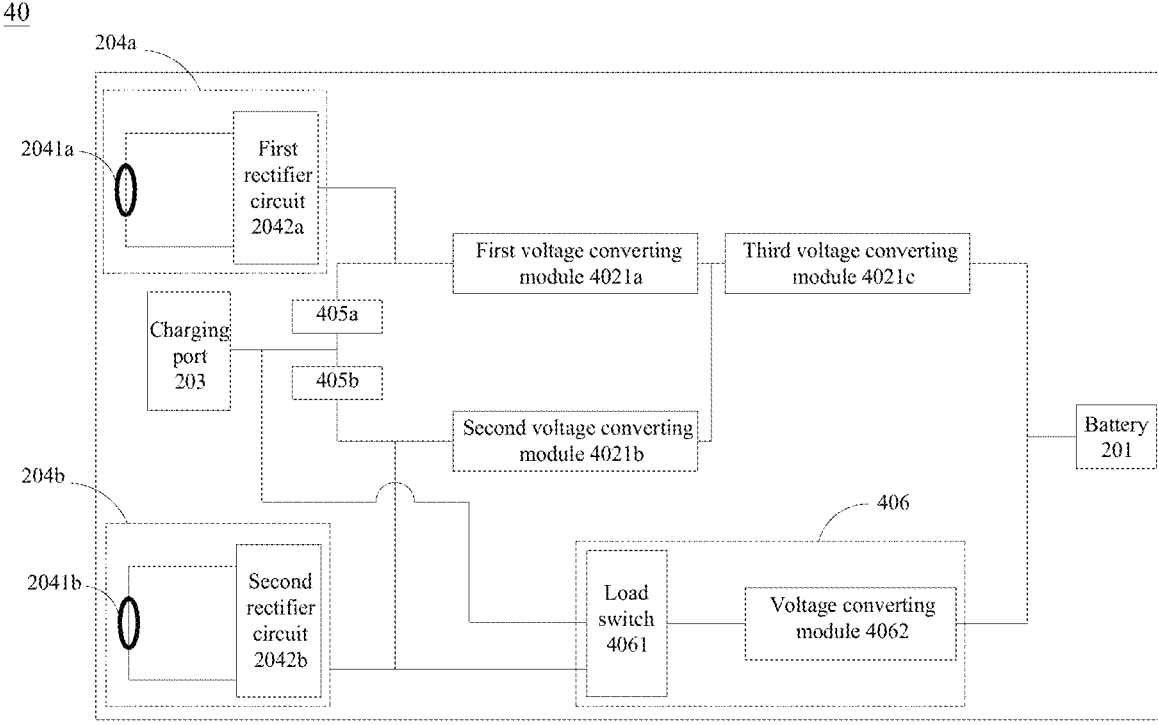
Figure 8C:
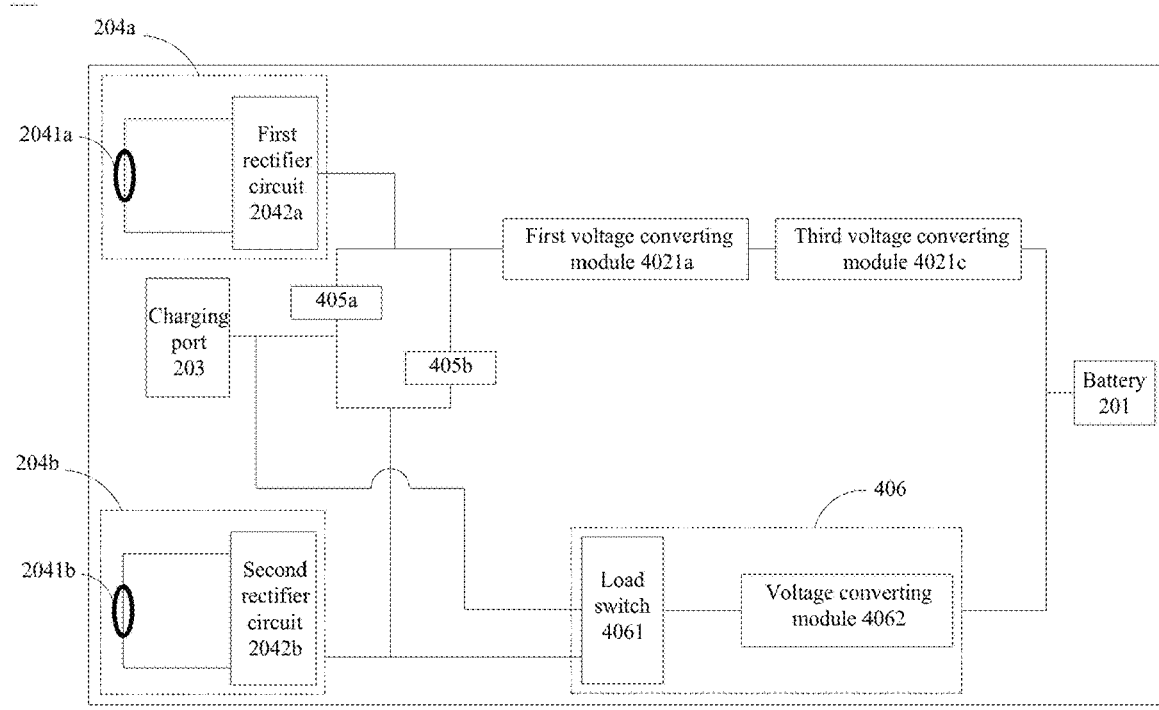

Additionally, FIG. 8A to FIG. 8C are schematic structural diagrams respectively showing yet another device to be charged provided by an exemplary embodiment of the disclosure. When the battery 201 merely includes a single cell or includes double cells in parallel, as shown in FIG. 8A, the first charging circuit 202a may further include a third voltage converting module 4021c, the second charging circuit 202b may further include a fourth converting module 4021d. The third voltage converting module 4021c further converts the output voltage and/or the output current of the first voltage converting module 4021a, the fourth voltage converting module 4021d further converts the output voltage and/or the output current of the second voltage converting module 4021b, so as to meet the demands for charging voltage of the battery 201. Further, as shown in FIG. 8B, the third voltage converting module 4021c and the fourth voltage converting module 4021d in the FIG. 8A may also be implemented as one voltage converting module 4021c. Or, as shown in FIG. 8C, the first voltage converting module 4021a and the second voltage converting module 4021b in the FIG. 8A are also implemented merely as one voltage converting module 4021a.

Figure 9:
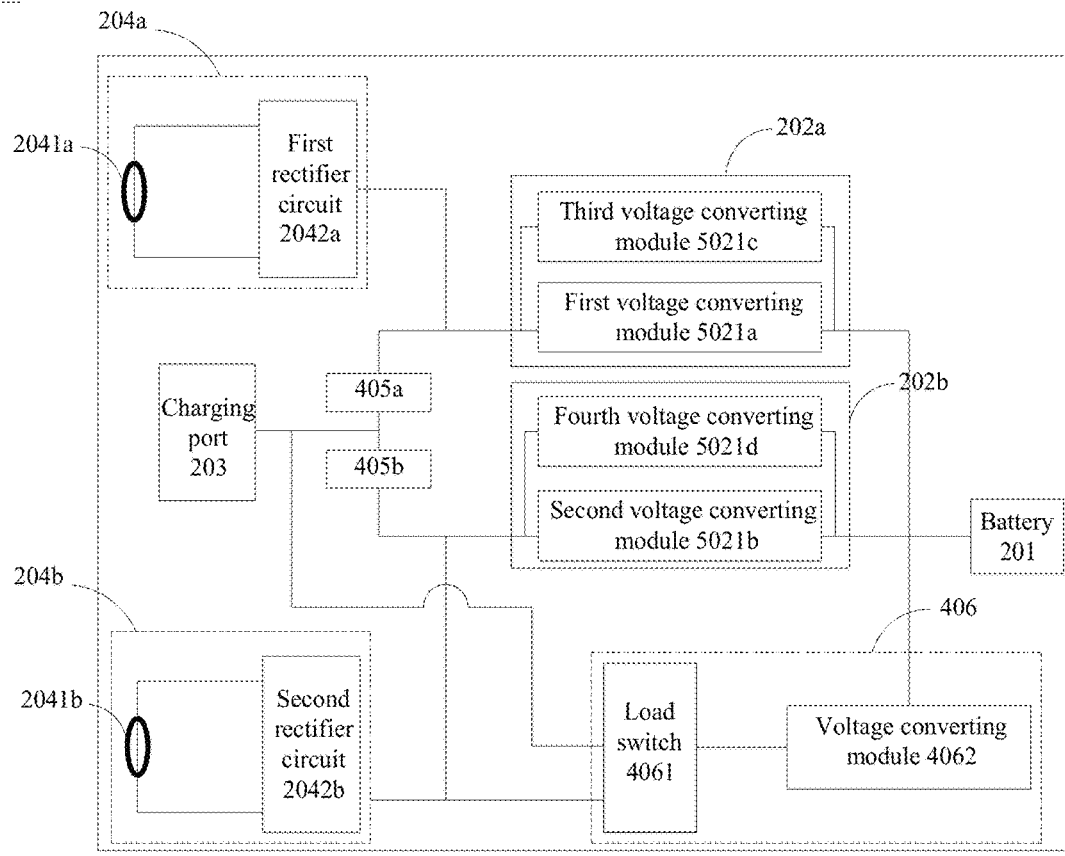
FIG. 9 is a schematic structural diagram showing yet another device to be charged provided by an exemplary embodiment of the disclosure.

FIG. 9 is a schematic structural diagram showing yet another device to be charged provided by a exemplary embodiment of the disclosure. As shown in the FIG. 9, in the device to be charged 50, the first charging circuit 202a includes: a first voltage converting module 5021a and a third voltage converting module 5021c. The third voltage converting module 5021c and the first voltage converting module 5021a are in parallel. Compared with a single voltage converting module, the input current of two voltage converting modules in parallel become smaller, thus reducing the calorific value.

Further, the second charging circuit 202b may also include: a second voltage converting module 5021b and a fourth voltage converting module 5021d. The fourth voltage converting module 5021d and the second voltage converting module 5021b are in parallel and configured to solve the heating problem may caused by using a single voltage converting module.

Figure 10:
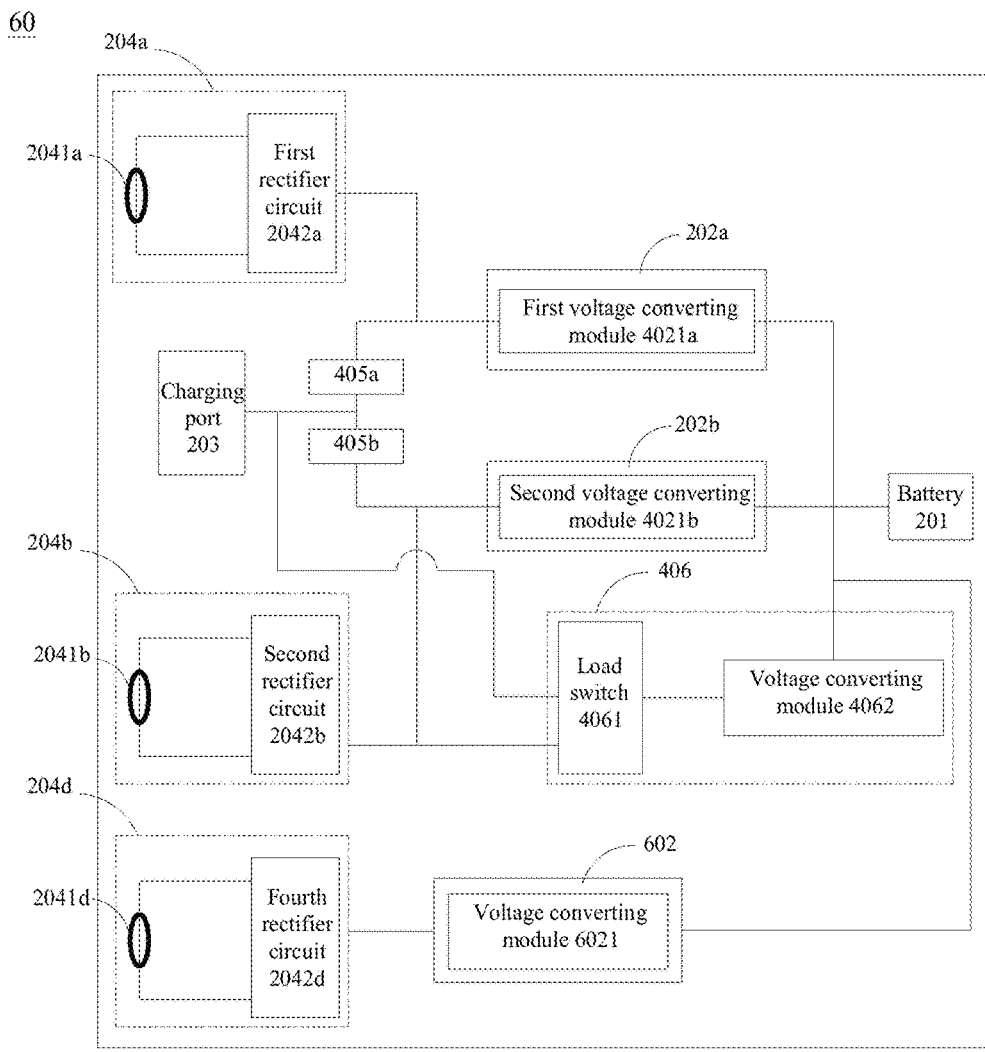
FIG. 10 is a schematic structural diagram showing yet another device to be charged provided by an exemplary embodiment of the disclosure.

FIG. 10 is a schematic structural diagram showing yet another device to be charged provided by an exemplary embodiment of the disclosure. As shown in FIG. 10, the device to be charged 60 may further include: a fourth wireless receiving circuit 204d and a fourth charging circuit 602. The fourth charging circuit 602 is in parallel with the battery 201, and in parallel with the first wireless receiving circuit 204a and the second wireless receiving circuit 204b. The fourth wireless receiving circuit 204d is connected with the fourth charging circuit 602, and configured for receiving the electromagnetic signal transmitted by the wireless charging device, converting the electromagnetic signal into an output voltage and an output current, and providing the output voltage and output current to the battery 201. The fourth charging circuit 602 may include at least a voltage converting module (such as the voltage converting module 6021 shown in the FIG. 10), which is configured for converting the charging voltage and/or charging current provided to the battery 201.

In the embodiments of the disclosure, a wireless receiving circuit and a charging circuit are further added, which may further improve the charging power during wireless charging, and accelerate the charging rate of wireless charging.

Figure 11:
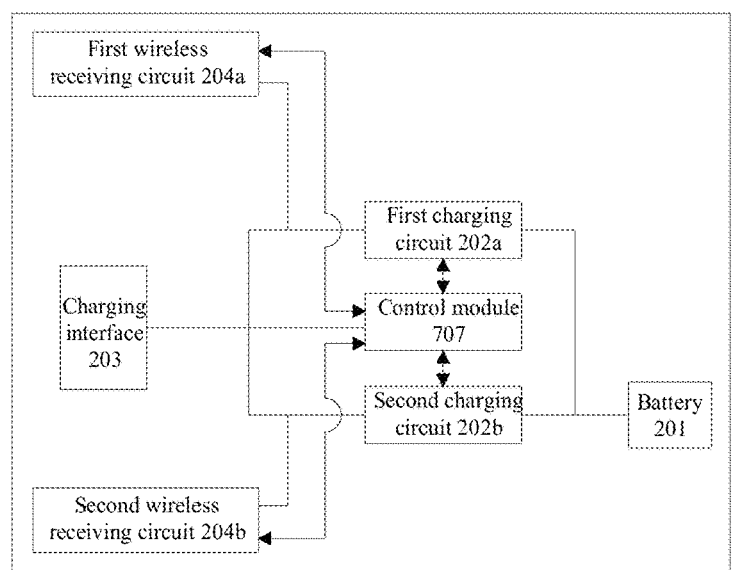
FIG. 11 is a schematic structural diagram showing yet another device to be charged provided by an exemplary embodiment of the disclosure.

FIG. 11 is a schematic structural diagram showing yet another device to be charged provided by an exemplary embodiment of the disclosure. Different from the device to be charged 20 shown in the FIG. 2, the device to be charged 70 shown in the FIG. 11 further includes: control module 707, respectively connected with the first charging circuit 202a and the second charging circuit 202b, and configured for, during different charging stages, controlling the first charging circuit 202a and/or the second charging circuit 202b to charge the battery. In addition, as shown in FIG. 11, the control module 707 are further connected with the first wireless receiving circuit 204a, the second wireless receiving circuit 204b and the charging port 203.

The control module 707 may be implemented by, for example, independent MCU, or may also be implemented by AP inside the device to be charged 70.

It should be understood by those skilled in the art that although the device to be charged 70 including two charging circuits and two wireless receiving circuits is taken as an example in FIG. 11, when as described above, the device to be charged 70 further includes more charging circuits and more wireless receiving circuits, the control module 707 is configured for controlling at least one of the at least two wireless receiving circuits to charge the battery 201.

Each charging stage in the charging process of battery is firstly described below.

The charging process of the battery may include the following charging stages: trickle charging stage, constant current charging stage, constant voltage charging stage.

Wherein the trickle charging stage, a battery discharged to a preset threshold voltage is firstly pre-charged (that is, recovery charging), and the trickle charging current is usually one tenth of the constant charging current. When the voltage of the battery rises above a trickle charging threshold voltage, the charging current is increased to enter the constant current charging stage.

In the constant current charging stage, the battery is charged with a constant current, the battery voltage rises rapidly, and when the battery voltage reach the expected threshold voltage (or the cut-off voltage) of the battery, it will switched to the constant voltage charging stage.

In the constant voltage charging stage, the battery is charged with a constant voltage, the charging current gradually decreases, and when the charging current is decreased to a set threshold current (the threshold current is usually one tenth or lower of the value of the charging current in the constant current charging stage, optionally, the current threshold may be tens of milliamps or lower), the battery is fully charged.

Furthermore, when the battery is fully charged, some current loss will occur because of the influence of the self-discharge of the battery, at this time, the battery is switched to supplementary charging stage. In the supplementary charging stage, the charging current is very small, merely to ensure that the battery is in a state of full quantity of electricity.

It should be noted that the constant charging stage mentioned in the embodiments of the disclosure does not require the charging current to remain completely constant, which may, for example, generally refer to the peak value or the average value of the charging current remaining constant during a period of time.

In practice, the manner of Multi-stage constant current charging may be adopted, in the constant current charging stage, for charging.

The Multi-stage constant current charging may have M constant current stages (M is an integer no less than 2). The first stage of charging of the Multi-stage constant current charging is started with a set charging current, the M constant current stages of the Multi-stage constant current charging are executed sequentially from the first stage to the Mth stage. When the current turns from a previous constant current stage in the constant current stages to a next constant current stage, the size of the current may be reduced; when the battery voltage reach a charging threshold voltage corresponding to this constant current stage, the current will switch to the next constant current stage. The current conversion between two adjacent constant current stages may be gradual changes, or may be stepped jump changes.

As can be seen above, in the charging process of the battery, the charging current is largest in the constant current charging stage, which makes the battery voltage increases rapidly. In order to further accelerate the charging speed of the battery, for example, a plurality of charging circuits may be used in the constant current charging stage to charge, such as above-mentioned two charging circuits or three charging circuits. That is, each charging circuit is controlled by the control module 707 in the device to be charged 70 to charge the battery 201.

Furthermore, in the trickle charging stage and/or the constant voltage charging stage, because the required charging current is small, a single charging circuit may still be used for charging, such as one of the plurality of charging circuits described above. Or, in the trickle charging stage and/or the constant voltage charging stage, a plurality of charging circuits may also be adopted for charging. That is, each charging circuit is controlled by the control module 707 in the device to be charged 70 to charge the battery 201. When only part of the charging circuits is used, unused charging circuits may be controlled by the control module 707 to be closed (when during wireless charging, unused wireless receiving circuits may be controlled to be closed).

It should be understood by those skilled in the art that although the above-mentioned trickle charging stage, the constant charging stage, the constant voltage charging stage are taken as an example, the "different charging stages" described in this present disclosure are not limited thereto. For example, the charging process of the battery 201 may merely include a trickle charging stage and a constant current charging stage, but not a constant voltage charging stage; or merely a constant current charging stage and a constant voltage charging stage, but not a trickle charging stage. Further, other charging stages may also be possible.

Furthermore, in some embodiments, the device to be charged 70, during wireless charging, may be placed on a wireless charging device only including a single wireless transmitting circuit. The control module 707 in the device to be charged 70 may also be configured for detecting the wireless transmitting circuit included in the wireless charging device, for example, the number of the wireless transmitting circuits may be detected by communicating with the opposite wireless transmitting circuits through the first wireless receiving circuit 204a and/or the second wireless receiving circuit 204b. When it is detected that the wireless charging device merely includes a single wireless transmitting circuit, the control module 707 may also be configured for using the first wireless receiving circuit 204a or the second wireless receiving circuit 204b to charge the battery 201. For example, when the first wireless receiving circuit 204a is used, the wireless charging channel including the second wireless receiving circuit 204b is closed accordingly; or, when the second wireless receiving circuit 204b is used, the wireless charging channel including the first wireless receiving circuit 204a is closed accordingly.

Although the foregoing description that the device to be charged 70 includes two wireless receiving circuits, and the wireless charging device includes a wireless transmitting circuit, is used to illustrate that how to charge the device to be charged 70 wirelessly when the numbers of the coils between the device to be charged 70 and the wireless charging device do not match, those skilled in the art should understand that there may be a situation that the device to be charged 70 described above includes 3 wireless receiving circuits, and the wireless charging device includes 2 wireless transmitting circuits. In this situation, the device to be charged 70 may also be controlled by the control module 707 to detect the number of the wireless transmitting circuits included in the wireless charging device. When the device to be charged 70 and the wireless charging device are detected to be mismatched, part of the wireless receiving circuits in the device to be charged 70 and the wireless transmitting circuit of the wireless charging device are used to form a wireless charging channel for wireless charging.

The charging modes of the device to be charged are described below.

The device to be charged 70 may support a first charging mode and a wireless charging mode. The charging power provided to the battery 201 in the first charging mode, is higher than the charging power provided to the battery 201 in a second charging mode.

The first charging mode may be a quick charging mode. During wireless charging, the quick charging mode may refer to a charging mode in which the transmitting power of the wireless charging device 22 is relatively large (usually greater than or equal to 15 W). During wired charging, the quick charging mode may refer to a charging mode in which the output power of the power supply device 11 is relatively large (usually greater than or equal to 20 W).

The second charging mode may be an ordinary charging mode. During wireless charging, the ordinary charging mode may refer to a charging mode in which the transmitting power of the wireless charging device 22 is relatively small (usually smaller than 15 W, and commonly used transmitting power is 5 W or 10 W), such as a traditional wireless charging mode based on QI standard, PMA standard, or A4WP standard. During wired charging, the ordinary charging mode may refer to a charging mode in which the output power provided by the power supply device 11 is relatively small (usually smaller than or equal to 10 W).

In the ordinary charging mode, it usually need to take several hours of time to fully charge a battery with a relatively large capacity (such as a battery of 3000 milliamp hours). However, compared with the ordinary charging mode, the charging time required to charge a battery of the same capacity completely fully in the quick charging mode can be significantly shortened and the charging speed is faster.

From the above, in the first charging mode, the charging current is the largest, so that the battery voltage increases rapidly. In order to accelerate the charging speed of the battery, for example, a plurality of charging circuits may be used during the constant current charging stage for charging, such as the two charging circuits or the three charging circuits described above. That is, each charging circuit is controlled by the control module 707 in the device to be charged 70 to charge the battery.

Furthermore, in the second charging mode, because the required charging current is relatively small, a single charging circuit may also be used for charging, such as one of the charging circuits described above. Or, a plurality of charging circuits may also be adopted in the trickle charging stage or the constant voltage charging stage for charging. That is, each charging circuit is controlled by the control module 707 in the device to be charged 70 to charge the battery 201. When merely part of the charging circuits is used, unused charging circuits may be closed respectively by the control module 707 (when during wireless charging, unused wireless receiving circuits may be controlled to be closed).

Refer to FIG. 7A and FIG. 11 together, the control module 707 is further configured for controlling the first voltage converting module 4021a and the second voltage converting module 4021b, so as to perform the conversion described above through the first voltage converting module 4021a and the second voltage converting module 4021b respectively.

For example, in the constant current charging stage or the first charging mode described above, when the battery 201 is charged through two charging circuits, the control module 707 control the first voltage converting module 4021a and the second converting module 4021b simultaneously, so as to perform the conversion described above through the first voltage converting module 4021a and the second voltage converting module 4021b respectively.

Or, as described above, in the constant voltage and/or trickle charging stage, the battery 201 is charged through one of the two charging circuits. When the first charging circuit 202a is used, the control module 707 controls the first voltage converting module 4021a to perform the conversion described above; when the second charging circuit is used, the control module 707 controls the second voltage converting module 4021b to perform the conversion described above.

Furthermore, as described above, when it is detected that the wireless charging device for charging the device to be charged 70 includes merely a single wireless transmitting coil, if the first wireless receiving circuit 204a is used to receive electromagnetic waves, the control module 707 controls the first voltage converting module 4021a to perform the conversion described above; if the second wireless receiving circuit 204b is used to receive an electromagnetic signal, the control module 707 controls the second voltage converting module 4021b to perform the conversion described above.

Refer to FIG. 9 and FIG. 11 together, in some embodiments, as described above, in the trickle charging stage and/or the constant current charging stage or the second charging mode described above, or when the wireless charging device merely include a single wireless transmitting circuit, and only one charging circuit is used for charging, such as the first charging circuit 202a is used to charge the battery 201, the input voltage input into the 202a may be converted through the third voltage converting module 5021c, and the converted charging voltage/charging current is directly applied to both ends of the battery to charge the battery 201.

At this time, the control module 707 closes the channel between the first voltage converting module 5021a and the battery 201, and controls the third voltage converting module 5021c to work.

Refer to FIG. 7B and FIG. 11 together, when the first charging circuit 202a and the charging circuit 202b work at the same time, the voltage converting module 4021a is configured for converting the voltage and/or the current input simultaneously. When one of the first charging circuit 202*a* and the second charging circuit 202*b* is working, the voltage converting module 234 is configured for converting the voltage and/or the current inputted from one of the first charging circuit 202*a* and the second charging circuit 202*b*.

Figure 12:
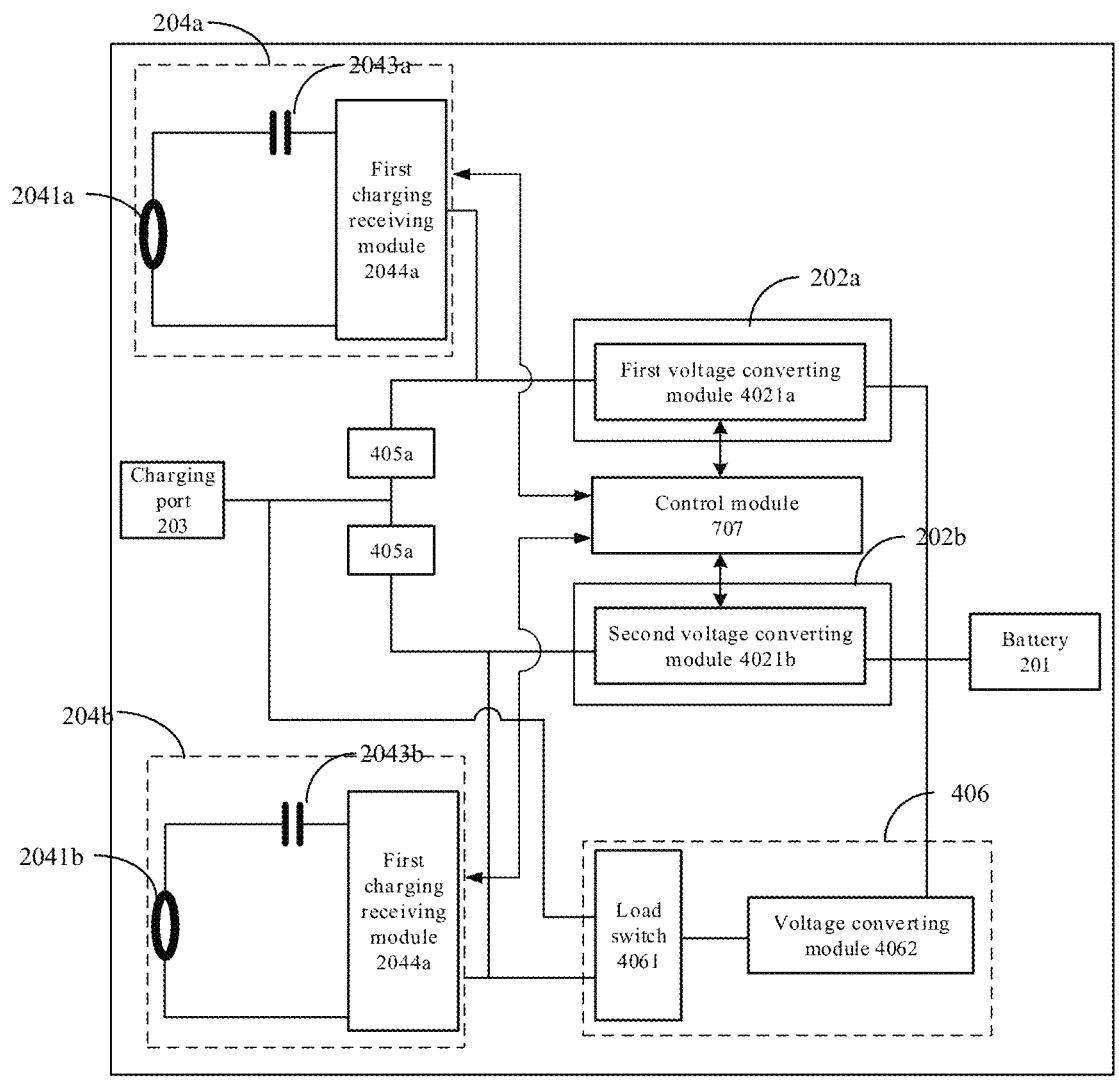
FIG. 12 is a schematic structural diagram showing yet another device to be charged provided by an exemplary embodiment of the disclosure.

FIG. 12 is a schematic structural diagram showing yet another device to be charged provided by an exemplary embodiment of the disclosure.

Refer to FIG. 12, the first wireless receiving circuit 204*a* in the device to be charged 80 includes: a first receiving coil 2041*a* and a first charging receiving module 2044*a*. Wherein, the first charging receiving module 2044*a* not only can perform the rectification and/or filtering operations in the first shaping circuit 2042*a*, but also can implement wireless charging standard, such as the control flow of QI standard, PMA standard or A4WP standard, etc. and other related functions of protection and control.

The second wireless receiving circuit 204*b* includes: the second receiving coil 2041*b* and the second charging receiving module 2044*b*. Wherein the second charging receiving module 2044*b* can not only perform the rectification and/or filtering operations in the second shaping circuit 2042*b*, but also can implement wireless charging standard, such as the control flow of QI standard, PMA standard, or A4WP standard etc. and other related functions of protection and control.

Further, the first charging receiving module 2044*a* may communicate with the second charging receiving module 2044*b* to transfer the charging information of the second charging receiving module 2044*b* described above, thereby communicating with the wireless charging device 22 through one of the first wireless receiving circuit 204*a* and the second wireless receiving circuit 204*b*.

Further, the first wireless receiving circuit 204*a* and the second wireless receiving circuit 204*b* may further include a first capacitance 2043*a* and a second capacitance 2043*b*.

Refer to FIG. 2 to FIG. 12 together, during wireless charging, the control module 707 may also be configured for wireless communication with the wireless charging device 22 during the process of wirelessly charging the device to be charged 20 by the wireless charging device 22. For example, wireless communication is performed with the control module 222 in the wireless charging device 22. The charging information of the device to be charged 20 (or the device to be charged 30/40/50/60/70/80) is sent to the wireless charging device 22 through communication.

The charging information may include, for example, the charging information of each of the first wireless receiving circuit 204*a* and the second wireless receiving circuit 204*b*, such as the output voltage and/or the output current, etc.

The communication mode and the communication sequence between the wireless charging device 22 and the device to be charged 20 (or the device to be charged 30/40/50/60/70/80) are not limited in this present disclosure.

In some embodiments, the wireless communication between the wireless charging device 22 and the device to be charged 20 (the device to be charged 30/40/50/60/70/80) may be unidirectional wireless communication. Taking the device to be charged 20 (the device to be charged 30/40/50/60/70/80) being the initiator of the communication, and the wireless charging device 22 being the receiver of the communication as an example, for example, the control module 707 may transmit the charging information of the device to be charged 20 (the device to be charged 30/40/50/60/70/80) to the wireless charging device 22.

In some embodiments, the wireless communication between the wireless charging device 22 and the device to be charged 20 (the device to be charged 30/40/50/60/70/80) may also be bidirectional wireless communication. Bidirectional wireless communication generally requires that the receiver transmits a response information to the initiator after receiving a communication request initiated by the initiator. Bidirectional communication can make the communication process safer. During the process of bidirectional wireless communication, any one of the wireless charging device 22 and the device to be charged 20 (or the device to be charged 30/40/50/60/70/80) may act as a master device to initiate bidirectional communication session, the other one may accordingly act as a slave device to make a first response or a first reply to the communication initiated by the master device. Further, the master device makes a targeted second response after receiving the first response or the first reply, thereby completing a process of communication and negotiation between the master device and the slave device.

Acting as a master device to make a targeted second response after receiving the first response or the first reply includes: the master device will also make a targeted second response to the first response or the first reply of the slave device, when the master device does not receive the first response or the first reply from the slave device targeted to the communication session within preset time.

Furthermore, after the slave device makes the first response or the first reply to the communication session initiated by the master device, a process of communication and negotiation between the master device and the slave device may be considered to be completed without the master device making a targeted second response to the first response or the first reply of the slave device.

During the communication or the wireless charging device 22 and the device to be charged 20 (or the device to be charged 30/40/50/60/70/80), the charging information of each of the first wireless receiving circuit 204*a* and the second wireless receiving circuit 204*b* may be coupled to the first receiving coil 2041*a* and the second receiving coil 2041*b* by the control module 707 in the device to be charged 20 (or the device to be charged 30/40/50/60/70/80), and sent to the control module 222 of the wireless charging device 22.

Or, the charging information of the first wireless receiving circuit 204*a* and the charging information of the second wireless receiving circuit 204*b* may be transmitted through a receiving coil of a wireless receiving circuit, for example, transmitted both through the first receiving coil 2041*a*, or transmitted both through a second receiving coil 2041*b*. The first wireless receiving circuit 204*a* and the second wireless receiving circuit 204*b* may communicate with each other to exchange their charging information.

Or, the device to be charged 20 (or the device to be charged 30/40/50/60/70/80) may also communicate with the wireless charging device 22 through at least one of Bluetooth, WiFi, mobile cellular network communication (such as 2G, 3G, 4G, 5G), wireless communication (such as IEEE 802.11, 802.15(WPANs), 802.16(WiMAX), 802.20, etc.), near field wireless communication based on high-frequency antenna (such as 60 GHz), optical communication (such as infrared communication), ultrasonic communication, ultra-mobile broadband (UMB) communication, and other communication manners, to transmit the above-mentioned feedback information to the wireless charging device 22. It should be understood that, when communicating with the above-mentioned communication manners, the device to be charged 20 (or the device to be charged 30/40/50/60/70/80) and the wireless charging device 22 further includes corresponding communication module, such as at least one of Bluetooth communication module, WiFi communication module, 2G/3G/4G/5G mobile communication module, high-frequency antenna, optical communication module, ultrasonic communication module, UMB communication module, etc. It should be understood that the standards described above applicable to wireless communication include past and existing standards, and, without departing from the scope of the disclosure, also include future versions of these standards and future standards. Communicating through the above-mentioned wireless communication manners, the reliability of the communication may be improved, thereby improving the safety of charging. Compared with the communication manner for coupling the feedback information to the receiving coil of the wireless receiving circuit through signal modulation in the related art (such as Qi standard), the reliability of the communication may be improved, and the voltage ripple caused by adopting signal coupling communication, which affects the voltage processing of the voltage converting module in the device to be charged, may be avoided. Further, regarding voltage ripple of the wireless receiving coil during outputting, if the ripple is not processed effectively, safety issues of wireless charging may be caused, thereby existing certain safety risks. Communicating through the above-mentioned wireless communication manners, the voltage ripple may be eliminated, thereby omitting circuits for processing the voltage ripple, reducing the complexity of the charging circuits of the device to be charged, improve the charging efficiency, saving the space for circuits setting, and reduce the cost.

The charging information described above may include, for example, the output voltage and/or the output current of each of the first wireless receiving circuit 204a and the second wireless receiving circuit 204b.

After receiving the charging information fed back by the control module 707, the wireless charging device 22 may adjust the first wireless transmitting circuit 221a based on the received charging information, so that the output voltage and/or current of the first wireless receiving circuit 204a matches the charging voltage and/or the charging current required by the battery 201; and adjust the second wireless transmitting circuit 221b based on the received charging information, so that the output voltage and/or current of the second wireless receiving circuit 204b matches the charging voltage and/or the charging current of the battery 201.

It should be understood that the above-mentioned "match" includes: the output voltage and/or the output current match the charging voltage and/or the charging current required by the battery 201 float within a preset scope.

Or, the wireless charging device 22 may adjust the first wireless charging transmitting circuit 221a based on the received charging information, so that the output voltage and/or current of the first wireless receiving circuit 204a meet the charging requirements of at least one charging stage of the trickle charging stage, the constant current charging stage, and the constant voltage charging stage described above; and adjust the second wireless transmitting circuit 221b based on the received charging information, to meet the requirements of at least one charging stage of the trickle charging stage, the constant current charging stage, and the constant voltage charging stage described above.

Further, as described above, the control module 707 may also transmit battery state information to the control module 222. Wherein the battery state information includes: the current quantity of electric charge and/or the current voltage of the battery 201 in the device to be charged 20 (or 30/40/50/60/70/80). After receiving the battery state information, the control module 222 may first determine the current charging stage of the battery 201 according to the battery state information, and then determine the target output voltage and/or the target charging current matching the current charging stage of the battery 201; then, the control module 222 may compare the output voltage and/or the output current of each wireless receiving circuit transmitted by the control module 707 with the determined target output voltage and/or target charging current of the battery 201, to determine whether the output voltage and/or the output current of each wireless receiving circuit matches the determined current charging stage of the battery 201. If they do not match, adjust the transmitting power of each wireless transmitting circuit until the output voltage and/or the output current of each wireless receiving circuit fed back matches the current charging stage of the battery 201.

Furthermore, as described above, the control module 707 may also feed back the detected output voltage and/or output current of each wireless receiving circuit directly, and may also feed back adjusting instruction determined according to the detected output voltage and/or output current or each wireless receiving circuit. The adjusting instruction may be, for example, a instruction for increasing or decreasing the transmitting power of each wireless transmitting circuit. Or, the wireless charging device 22 may set a plurality of levels of transmitting power for each wireless transmitting circuit, so that the control module 222 adjusts the transmitting power of each wireless transmitting circuit by one level every time the adjusting instruction is received, until that the output voltage and/or the output current of each wireless transmitting circuit fed back matches the current charging stage of the battery 201. Or, the adjusting instruction may also configured for indicating the wireless charging device to stop charging when there is an abnormal charging, the abnormal charging includes, for example, overcurrent of the charging current, overvoltage, abnormal heating, etc.

In addition, the charging information may also include temperature information. The temperature information may include, for example, at least one of the following information: the temperature of the battery 201, the highest temperature (such as the highest temperature in temperatures detected from a plurality of positions of the back housing) of the back housing of device to be charged 20 (or 30/40/50/60), and temperatures of different preset positions of the device to be charged 20 (or 30/40/50/60). The temperature information may be transmitted by, for example, the first receiving coil 2041a and the second receiving coil 2041b simultaneously, may also be transmitted merely by one of the first receiving coil 2041a and the second receiving coil 2041b.

As described above, after receiving the charging information fed back by the device to be charged 20 (or 30/40/50/60) described above, the wireless charging device 22 may adjust the transmitting power of the first wireless transmitting circuit 221a and/or the second wireless transmitting circuit 221b based on the charging information.

When the output voltage (or the output power) of the power supply device 11 remains constant, the input voltages of the first wireless transmitting circuit 221a and the second wireless transmitting circuit 221b remain constant. At this time, the control module 222 may adjust the working frequency and/or the duty cycle of the transmitted electromagnetic signal of the first wireless transmitting circuit 221a, the second wireless transmitting circuit 221b, so as to adjust the transmitting power of the first wireless transmitting circuit 221a and/or the second wireless transmitting circuit 221b.

In addition, the above-mentioned charging information may also include temperature information. The temperature information may include, for example, at least one of the following information: the temperature of the battery 201, the highest temperature (such as the highest temperature in temperatures detected from a plurality of positions of the back housing) of the back housing of the device to be charged 20 (or 30/40/50/60), and the temperature information of each preset position of the device to be charged 20 (or 30/40/50/60), or indicating information based on the temperature information. The control module 222 may respectively adjust the transmitting power of the first wireless transmitting circuit 221a and/or the second wireless transmitting circuit 221b, by adjusting the working frequency and/or the duty cycle of the transmitted electromagnetic signal of the first wireless transmitting circuit 221a and the second wireless transmitting circuit 221b based on the temperature information or the indicating information, so that the temperature control for different positions of the device to be charged 20 (or 30/40/50/60) is implemented. For example, when the temperature near the first wireless receiving circuit 204a of the device to be charged 20 (or 30/40/50/60) is too high, the transmitting power of the first wireless transmitting circuit 221a coupling to the first wireless receiving circuit 204a is reduced; and when the temperature near the second wireless receiving circuit 204b is too high, the transmitting power of the second wireless transmitting circuit 221b coupling to the second wireless receiving circuit 204b is reduced.

In some embodiments, when the output voltage and/or the output current of the power supply device 11 is adjustable, the control module 222 may communicate with the power supply device 11, and request the power supply device to provide corresponding output voltage to adjust the transmitting power of the first wireless transmitting circuit 221a and/or the second wireless receiving circuit 204b, so that the output voltage and/or the output current of the first wireless receiving circuit 204a and/or the second wireless receiving circuit 204b matches the charging requirements of the battery 201 during the current charging stage.

Furthermore, the control module 222 may also adjust the power extracted from the output power provided by the power supply device 11, thereby adjusting the transmitting power of the first wireless transmitting circuit 221a and/or the second wireless transmitting circuit 221b. For example, a power adjusting circuit is arranged inside the wireless charging device 22. The power adjusting circuit may include, for example, a Pulse Width Modulation (PWM) controller and a switch unit. The control module 222 may adjust the transmitting power of the first wireless transmitting circuit 221a and/or the second wireless transmitting circuit 221b, by adjusting the duty cycle of the control signals transmitted by the PWM controller, and/or controlling the switching frequency of the switch unit.

After considering the specification and practicing the invention disclosed herein, other embodiments of the disclosure may be readily occur to them. The disclosure is intended to cover any variations, applications or adaptions of this disclosure, and these variations, applications or adaptions follow the general principles of the disclosure and include common sense or conventional technical means in the art not disclosed in the disclosure. The specification and embodiments are merely considered to be exemplary, and the true scope and spirit of the disclosure are defined by the appended claims.

What is claimed is:

1. An electronic device, comprising:
   a battery;
   at least two charging circuits, respectively connected with the battery;
   a charging port, connected with the at least two charging circuits, and configured for receiving a voltage and a current outputted by a power supply device; wherein the at least two charging circuits are configured for processing a first output voltage and a first output current output of the charging port and providing the processed first output voltage and first output current to the battery for charging; and
   at least two wireless receiving circuits, connected with the at least two charging circuits by one-to-one correspondence, wherein the at least two wireless receiving circuits are configured for receiving an electromagnetic signal transmitted by a wireless charging device, and converting the electromagnetic signal into a second output voltage and a second output current; wherein the at least two charging circuits are further configured for processing the second output voltage and the second output current output by the at least two wireless receiving circuits and providing the processed second output voltage and second output current to the battery for charging.

2. The electronic device as claimed in claim 1, wherein each charging circuit comprises: at least one voltage converting module, configured for converting an input signal inputted into the at least two charging circuits, wherein the input signal comprises at least one of an input voltage and an input current from the charging port or the at least two wireless receiving circuits.

3. The electronic device as claimed in claim 2, wherein the at least two charging circuits comprises: a first charging circuit and a second charging circuit; and the at least two wireless receiving circuits comprises: a first wireless receiving circuit and a second wireless receiving circuit;
   wherein, the first wireless receiving circuit is connected with the first charging circuit, and the second wireless receiving circuit is connected with the second charging circuit.

4. The electronic device as claimed in claim 3, wherein the first charging circuit comprises a first voltage converting module and a third voltage module in parallel with the first voltage converting module; the second charging circuit comprises a second voltage converting module.

5. The electronic device as claimed in claim 4, wherein the second charging circuit further comprises: a fourth voltage converting module, in parallel with the second voltage converting module.

6. The electronic device as claimed in claim 3, wherein the electronic device further comprises: a compatible charging circuit, connected with the battery; the compatible charging circuit comprises: a load switch and at least one voltage converting module; the load switch comprises two inputs and an output, wherein the two inputs are respectively connected with the first wireless receiving circuit, and the output are connected with the voltage converting module in the compatible charging circuit.

7. The electronic device as claimed in claim 4, wherein the electronic device further comprises a control module, respectively connected with the at least two charging circuits, and configured for controlling one of the at least two charging circuits to charge the battery according to a current charging stage or a current charging mode of the battery.

8. The electronic device as claimed in claim 7, wherein the control module is configured for:

when the current charging stage is a constant current charging stage, or when the current charging mode is a first charging mode, controlling the first charging circuit and the second charging circuit to charge the battery;

when the current charging stage is any one of a trickle charging stage and a constant voltage charging stage, or when the current charging mode is a second charging mode, controlling the first charging circuit or the second charging circuit to charge the battery;

wherein, in different charging modes, a charging power provided to the battery by the electronic device is different.

9. The electronic device as claimed in claim 8, wherein a charging power provided to the battery in the first charging mode is higher than a charging power provided to the battery in the second charging mode.

10. The electronic device as claimed in claim 8, wherein the first charging circuit comprises: a first voltage converting module and a third voltage converting module, and the first voltage converting module are in parallel with the third voltage converting module; the second charging circuit comprises a second voltage converting circuit;

the control module is further configured for, when the current charging stage is the constant current charging stage, or when the current charging mode is the first charging mode, controlling the first voltage converting module to convert a first input signal inputted into the first charging circuit, and controlling the second voltage converting module to convert a second input signal inputted into the second charging circuit; each of the first input signal and the second input signal, comprises at least one of an input voltage and an input current;

the control module is further configured for, when the current charging stage is any one of the trickle charging stage and the constant voltage charging stage, or when the current charging mode is the second mode, controlling the third voltage converting module to convert the first input signal.

11. The electronic device as claimed in claim 7, wherein the control module is further configured for, when the current charging mode is a wireless charging mode, and when the wireless charging device is transmitting the electromagnetic signal merely through a single wireless transmitting circuit, controlling the first charging circuit to charge the battery.

12. The electronic device as claimed in claim 11, the control module is further configured for, when the current charging mode is the wireless charging mode, and when the wireless charging device is transmitting the electromagnetic signal merely through a single wireless transmitting circuit, controlling the third voltage converting module to convert a first input signal inputted into the first charging circuit.

13. The electronic device as claimed in claim 7, wherein the control module is further configured for, when the current charging mode is a wireless charging mode, controlling the electronic device to transmit a charging information of the electronic device to the wireless charging device, so that the wireless charging device adjusts the transmitting power of each wireless transmitting circuit in the wireless charging device.

14. The electronic device as claimed in claim 13, wherein the charging information comprises at least one of a group consisting of:

at least one of the second output voltage and the second output current of the first wireless receiving circuit; at least one of the second output voltage and the second output current of the second wireless receiving circuit; temperature information, comprising at least one of a group consisting of: the temperature of the battery, a highest temperature of a back housing of the electronic device, and the temperatures of different positions of the electronic device.

15. The electronic device as claimed in claim 7, wherein the control module is further configured for, when the current charging mode is a wireless charging mode, determining an adjusting instruction of the wireless charging device according to charging information of the electronic device, and controlling the electronic device to transmit the adjusting instruction to the wireless charging device; wherein the adjusting instruction is configured for indicating the wireless charging device to increase or decrease the transmitting power of each wireless transmitting circuit in the wireless charging device; or, the adjusting instruction is configured for indicating the wireless charging device to stop charging.

16. The electronic device as claimed in claim 3, wherein each wireless receiving circuit comprises: a receiving coil and an alternating current to direct current converting circuit connected with the receiving coil, the wireless receiving circuit is configured for converting the received electromagnetic signal into an alternating current through the receiving coil, and converting the alternating current into a direct current through the alternating current to direct current circuit;

wherein the receiving coils of the at least two wireless receiving circuits are arranged in a same plane in the electronic device.

17. The electronic device as claimed in claim 3, wherein the battery comprises a plurality of cells, the plurality of cells are in series with each other.

18. The electronic device as claimed in claim 3, wherein the battery comprises a plurality of cells, the plurality of cells are in parallel with each other.

19. An electronic device, comprising:
a battery;
at least two charging circuits, respectively connected with the battery;
a charging port, connected with the at least two charging circuits, and configured for receiving a voltage and a current outputted by a power supply device; wherein the at least two charging circuits are configured for processing a first output voltage and a first output current output of the charging port and providing the processed first output voltage and first output current to the battery for charging; and
at least two wireless receiving circuits, connected with the at least two charging circuits by one-to-one correspondence, wherein the at least two wireless receiving circuits are configured for receiving an electromagnetic signal transmitted by a wireless charging device, and converting the electromagnetic signal into a second output voltage and a second output current; wherein the at least two charging circuits are further configured for processing the second output voltage and the second output current output by the at least two wireless receiving circuits and providing the processed second output voltage and second output current to the battery for charging;
wherein the electronic device further comprises:
a third charging circuit, comprising at least one voltage module, connected with the battery, and discrete from the at least two charging circuits;

a third wireless receiving circuit, connected with the discrete charging circuit, discrete from the at least two wireless receiving circuit, and configured for receiving the electromagnetic signal transmitted by the wireless charging device, and converting the electromagnetic signal into a third output voltage and a third output current; wherein the discrete charging circuit is configured for processing the third output voltage and the third output current output by the discrete wireless receiving circuit and providing the processed third output voltage and third output current to the battery for charging.

20. An electronic device, comprising:
a battery;
at least two charging circuits, respectively connected with the battery;
a charging port, connected with the at least two charging circuits, and configured for receiving a voltage and a current outputted by a power supply device; wherein the at least two charging circuits are configured for processing a first output voltage and a first output current output of the charging port and providing the processed first output voltage and first output current to the battery for charging; and
at least two wireless receiving circuits, connected with the at least two charging circuits by one-to-one correspondence, wherein the at least two wireless receiving circuits are configured for receiving an electromagnetic signal transmitted by a wireless charging device, and converting the electromagnetic signal into a second output voltage and a second output current; wherein the at least two charging circuits are further configured for processing the second output voltage and the second output current output by the at least two wireless receiving circuits and providing the processed second output voltage and second output current to the battery for charging;
wherein each charging circuit comprises: at least one voltage converting module, configured for converting an input signal inputted into the at least two charging circuits, wherein the input signal comprises at least one of an input voltage and an input current from the charging port or the at least two wireless receiving circuits;
wherein each charging circuit further comprises: an overvoltage protection circuit, connected between the charging port and the voltage converting module, and configured for overvoltage protection to the power supply device.

* * * * *